United States Patent
Hurwitz et al.

(10) Patent No.: US 10,381,948 B2
(45) Date of Patent: Aug. 13, 2019

(54) POWER CONVERSION SYSTEM WITH ENERGY HARVESTING

(71) Applicant: Analog Devices Global, Hamilton (BM)

(72) Inventors: Jonathan Ephraim David Hurwitz, Edinburgh (GB); Seyed Amir Ali Danesh, Edinburgh (GB); William Michael James Holland, Edinburgh (GB)

(73) Assignee: Analog Devices Global, Hamilton (BM)

( * ) Notice: Subject to any disclaimer, the term of this patent is extended or adjusted under 35 U.S.C. 154(b) by 0 days.

(21) Appl. No.: 15/923,381

(22) Filed: Mar. 16, 2018

(65) Prior Publication Data

US 2018/0212531 A1    Jul. 26, 2018

Related U.S. Application Data

(63) Continuation-in-part of application No. 14/912,514, filed as application No. PCT/GB2014/000328 on Aug. 22, 2014, now Pat. No. 9,941,812.

(30) Foreign Application Priority Data

Aug. 22, 2013 (GB) .................. 1315061.0

(51) Int. Cl.
*H02M 7/217* (2006.01)
*H02M 7/00* (2006.01)

(52) U.S. Cl.
CPC ............ *H02M 7/217* (2013.01); *H02M 7/003* (2013.01); *H02M 7/2173* (2013.01)

(58) Field of Classification Search
CPC .......... H02M 7/04; H02M 7/21; H02M 7/217; H02M 7/2173
See application file for complete search history.

(56) References Cited

U.S. PATENT DOCUMENTS

| | | | |
|---|---|---|---|
| 4,514,782 A * | 4/1985 | Sakamoto | H01G 4/12 361/302 |
| 4,959,766 A | 9/1990 | Jain | |
| 6,396,724 B1 | 5/2002 | Hirst | |
| 8,861,236 B2 * | 10/2014 | Remmert | H02M 3/28 323/207 |
| 9,369,058 B2 | 6/2016 | Boys et al. | |
| 9,413,261 B2 | 8/2016 | Usami | |
| 9,941,812 B2 | 4/2018 | Hurwitz et al. | |

(Continued)

OTHER PUBLICATIONS

"U.S. Appl. No. 14/912,514, Ex Parte Quayle Action dated May 1, 2017", 10 pgs.

(Continued)

*Primary Examiner* — Gary L Laxton
(74) *Attorney, Agent, or Firm* — Schwegman Lundberg & Woessner, P.A.

(57) ABSTRACT

A power conversion apparatus or system can be configured to receive a high voltage alternating current (AC) signal at an input and to provide in dependence thereon a low voltage direct current (DC) signal from an output stage. The power conversion apparatus can include a main path comprising a high voltage capacitor in series with the input. In an example, the capacitor comprises a portion of an electric field energy harvesting system.

24 Claims, 11 Drawing Sheets

(56) References Cited

U.S. PATENT DOCUMENTS

| | | | |
|---|---|---|---|
| 2006/0034109 A1* | 2/2006 | Benabdelaziz | H02M 7/06 363/125 |
| 2010/0259240 A1 | 10/2010 | Cuk | |
| 2011/0063790 A1* | 3/2011 | Park | H05K 1/0239 361/679.31 |
| 2012/0133419 A1 | 5/2012 | Frey et al. | |
| 2013/0223117 A1 | 8/2013 | Koshy | |
| 2013/0308358 A1* | 11/2013 | Usami | H02M 7/04 363/84 |
| 2016/0197563 A1 | 7/2016 | Hurwitz et al. | |

OTHER PUBLICATIONS

"U.S. Appl. No. 14/912,514, Notice of Allowance dated Dec. 4, 2017", 5 pgs.

"U.S. Appl. No. 14/912,514, Preliminary Amendment dated Feb. 17, 2016", 10 pgs.

"U.S. Appl. No. 14/912,514, Response to Ex Parte Quayle Action dated Aug. 1, 2017", 11 pgs.

"DC Voltarge Regulators", DAE Notes, [online]. [retrieved on Nov. 25, 2014]. Retrieved from the Internet: <URL: http://www.daenotes.com/electronics/industrial-electronics/dc-voltage-regulators>, (2015), 3 pgs.

"International Application Serial No. PCT/GB2014/000328, International Search Report dated Mar. 19, 2015", 5 pgs.

"International Application Serial No. PCT/GB2014/000328, Written Opinion dated Mar. 19, 2015".

"Transformerless Power Supply Design", DesignNote 001a. Designer Circuits, LLC. [online]. [retrieved on Nov. 25, 2014]. Retrieved from the Internet: URL: <http://www.desigmercircuits.com/DesignNote1a.pdf>, (2010), 9 pgs.

Condit, Reston, "AN954 Transformerless Power Supplies: Resistive and Capacitive", (c) 2004 Microchip Technology, Inc. [online] [retrieved on Nov. 25, 2014], Retrieved from the Internet: <URL: <http://ww1.microchip.com/downloads/en/AppNotes/00954A.pdf>, (2004), 14 pgs.

Tomasz, Martin, "Use a Self-Powered Op Amp to Create Low-Leakage Rectifier", [online] [retrieved on Nov. 25, 2014]. Retrieved from the Internet: <URL: http://www.eeweb.com/blog/martin_tomasz/use-a-self-powered-op-amp-to-create-low-leakage-rectifier>, (Aug. 27, 2012), 4 pgs.

"Application Serial No. EP20140777737, EP First Examination Report dated Aug. 10, 2018", 15 pgs.

"European Application Serial No. 14777737.9, Communication Pursuant to Article 94(3) EPC dated Aug. 10, 2018", 15 pgs.

Guo, Feng, "Energy Harvesting Devices for High Voltage Transmission Line Monitoring", 2011 IEEE, (2011), 1-8.

Gupta, Vikram, "Energy Harvesting from Electromagnetic Energy Radiating from AC Power Lines", Real-time and Multimedia Systems LaboratoryCarnegie Mellon University, Pittsburgh, PA, (accessed Apr. 20, 2018), 5 pgs.

* cited by examiner

POWER CONVERSION SYSTEM WITH ENERGY HARVESTING

CLAIM OF PRIORITY

This application is a Continuation-in-Part of Hurwitz et al. U.S. application Ser. No. 14/912,514, filed on Feb. 17, 2016, which application is a U.S. National Stage Filing under 35 U.S.C. § 371 of International Patent Application Ser. No. PCT/GB2014/000328, filed Aug. 22, 2014, and published on Feb. 26, 2015, as WO 2015/025121 A2, and which claims the benefit of priority of GB Application Ser. No. 13150610.0, filed Aug. 22, 2013, each of which is incorporated herein by reference in its entirety.

TECHNICAL FIELD

The present invention relates to power conversion apparatus which is configured to receive an alternating current signal at an input and to provide in dependence thereon a direct current signal from an output stage. The present invention also relates to a power conversion arrangement comprising plural such power conversion apparatus.

BACKGROUND

Electronic apparatus is often powered from a mains electricity supply. Such electronic apparatus comprises power conversion apparatus which is operative to convert a high voltage alternating current (AC) supply to a low voltage direct current (DC) supply. Power conversion apparatus can be considered to belong to one of two different classes depending on whether or not the power conversion apparatus comprises a transformer. Transformers provide for isolation and relatively loss free voltage level conversion, amongst other things, but on the other hand they are typically large, heavy and expensive. Transformerless power conversion apparatus are comparatively inexpensive and small but are limited to low power applications and typically to less than 40 mW of direct current output power. At present transformerless power conversion apparatus are used mainly in AC powered applications which are operative on the mains side, such as in electricity meters, residual current detectors, home control and monitoring, PIR controlled exterior lights and fire alarms.

Transformerless power conversion apparatus can be considered to belong to one of two classes, namely resistive transformerless power conversion apparatus and capacitive transformerless power conversion apparatus. Resistive transformerless power conversion apparatus are normally wasteful of power and therefore limited to few low power applications. Capacitive transformerless power conversion apparatus are less wasteful of power than resistive transformerless power conversion apparatus but yet may waste more than ten to twenty times the output power.

A simple representation of capacitive transformerless power conversion apparatus is shown in FIG. 1. The power conversion apparatus 10 comprises a live connection 12 and a neutral connection 14 which are connected respectively to the live and neutral conductors of a mains electricity supply, such as a 240 V AC electricity supply. A first capacitor 16 and a resistor 18 are in series with the live connection. The first capacitor 16 is an X type capacitor which is designed to provide for safety at mains voltage levels. The resistor 18 is present to limit the inrush current to the first capacitor 16 if the power conversion apparatus is connected to the mains at a point in the mains cycle other than the zero crossing or in the event of a mains surge. The power conversion apparatus 10 further comprises a diode 20 in series with the first capacitor 16 and the resistor 18 which is oriented such that its anode is electrically connected to the resistor 18. The power conversion apparatus 10 also comprises a Zener diode 22 and a holding capacitor 24. The cathode of the Zener diode 22 is electrically connected between the resistor 18 and the diode 20 and the anode of the Zener diode 22 is electrically connected to the neutral connection 14. The holding capacitor 24 is electrically connected between the cathode of the diode 20 and the neutral connection. The power conversion apparatus 10 yet further comprises a positive voltage output connection 26 at the diode 20 side of the holding capacitor 24 and a low voltage output connection 28 at the neutral side of the holding capacitor 24. The positive and low voltage output connections 26, 28 constitute the output from the power conversion apparatus 10. The breakdown voltage of the Zener diode 22 minus the voltage drop across the diode 20 determines the voltage across the holding capacitor 24 and hence the output voltage from the power conversion apparatus 10.

The present inventors have appreciated that the Zener diode 22 in the power conversion apparatus of FIG. 1 provides for consumption of the same power irrespective of the power output from the power conversion apparatus. This is because the consumed power comprises power shunted by the Zener that is not used by the load. The greatest power conversion efficiency is obtained when the power conversion apparatus is operating under full load conditions with there being a progressive reduction in power conversion efficiency as the toad decreases. The present inventors have also appreciated that the power conversion efficiency of the power conversion apparatus is compromised by the power dissipated by the inrush current limiting resistor 18 and the voltage dropped across the Zener diode 22 irrespective of load conditions. The power dissipated by the resistor 18 is a function of the reactance of the first capacitor 16 and the resistance of the resistor 18.

The present invention has been devised in the light of the above mentioned appreciations. It is therefore an object for the present invention to provide improved power conversion apparatus which is configured to receive a high voltage alternating current signal at an input and to provide in dependence thereon a low voltage direct current signal from an output stage. It is a further object for the present invention to provide an improved power conversion arrangement comprising plural such power conversion apparatus.

SUMMARY

According to a first aspect of the present invention there is provided power conversion apparatus configured to receive a high voltage alternating current signal at an input and to provide in dependence thereon a low voltage direct current signal from an output stage, the power conversion apparatus comprising: a main path comprising a high voltage capacitor in series with the input; a first path operative to carry current carried by the main path in at least one of a positive going part and a negative going part of the high voltage alternating current signal; a second path operative to carry current carried by the main path in a positive going part and a negative going part of the high voltage alternating current signal; and first and second switches which are operative to determine when a respective one of the first and second paths carries current, in which the output stage receives current flowing in the first path and at least one of the first and second switches is operable in dependence on a control signal derived from the low voltage direct current signal.

The power conversion apparatus is configured to receive a high voltage alternating current (AC) signal, such as a mains AC signal, at the input and to provide in dependence thereon a low voltage direct current (DC) signal, such as an electronic circuit power supply, at the output stage. A peak voltage of the high voltage AC signal may be higher than a voltage of the low voltage DC signal. Depending on the configuration of the power conversion apparatus as described below, the first path may be operative to carry current in a positive going part only of the high voltage AC signal, in a negative going part only of the high voltage AC signal or in positive and negative going parts of the high voltage AC signal. The second path is operative to carry current in a positive going part and a negative going part of the high voltage AC signal. The power conversion apparatus may be configured such that the second path is operative to limit a voltage level within the power conversion apparatus. The second path may therefore be operative to perform a clamping action. The first and second switches may be operative substantially out of phase and perhaps out of phase with each other whereby the first and second switches are not closed at the same time.

The power conversion apparatus may be configured such that the first path is in series with the output stage and the second path is in parallel with the output stage. The second path may provide for conduction between a high side of the power conversion apparatus and a low side of the power conversion apparatus. The high voltage capacitor may be in series with a high side of the input to the power conversion apparatus. The power conversion apparatus may thus be configured depending on operation of the first and second switches, as described further below, to provide a positive low voltage DC supply. The output stage of the power conversion apparatus may therefore be referenced to a low side of the input to the power conversion apparatus, such as neutral where the power conversion apparatus receives a mains AC signal on live with respect to neutral. According to an alternative approach the output stage of the power conversion apparatus may be referenced to a low side of the input to the power conversion apparatus, such as live where the power conversion apparatus receives a mains AC signal on neutral with respect to live. According to an alternative approach, the high voltage capacitor may be in series with a low side of the input to the power conversion apparatus whereby the power conversion apparatus is configured depending on operation of the first and second switches, as described further below, to provide a negative low voltage DC supply. The output stage of the power conversion apparatus may therefore be referenced to a high side of the input to the power conversion apparatus, such as live where the power conversion apparatus receives a mains AC signal on live with respect to neutral. According to an alternative approach, the output stage of the power conversion apparatus may be referenced to a high side of the input to the power conversion apparatus, such as neutral where the power conversion apparatus receives a mains AC signal on live with respect to live.

The first path may comprise the first switch. The first switch may be in series between the input to and the output stage of the power conversion apparatus, such as in a high side of the power conversion apparatus. The second path may comprise the second switch. The second switch may be in parallel with high and low sides of the input to the power conversion apparatus. At least one of the first and second switches may be operated in dependence on a control signal at a frequency higher than a frequency of the high voltage AC signal.

The output stage may be configured to be attached to a load. The load may thus, in use, receive DC power from the power conversion apparatus. The output stage may be configured such that it comprises a high side output conductor and a low side output conductor. The power conversion apparatus may comprise a holding capacitor which is electrically coupled in parallel with the output stage, such as between the high side output conductor and the low side output conductor. During operation of the power conversion apparatus the holding capacitor may be charged by current flowing in the first path and may therefore be operative as a reservoir to accommodate power demand from a load connected to the output stage. In some forms of the power conversion apparatus which are described below the holding capacitor may be of lower value than is required in known circuits and may, in certain applications, not be required.

Each of the first and second paths may be operative to carry current in less than all of a positive going part or a negative going part within a cycle of the high voltage AC signal. The first or second path may therefore be operative to carry current in at least one portion and more preferably plural portions of a positive going part or a negative going part. For example a path may be operative to carry current during a portion which constitutes 25% of a complete positive or negative going part and perhaps during a portion in which a rate of change of the high voltage AC signal is greatest. Alternatively at least one the first and second paths and more specifically the second path may be operative to carry current for at least one cycle and perhaps for plural cycles. For example where load demand is low and where the power conversion apparatus comprises a holding capacitor there may be no need to re-charge the holding capacitor over plural complete cycles of the high voltage AC signal. At least one of the first and second paths and more specifically the first path may not be operative to carry current every positive going part or negative going part. For example and as described further below, the second path may be operative to carry current on an intermittent basis when a clamping action is required. By way of another example the first path may be operative to carry current on an intermittent basis when current is required in the output stage, such as for maintaining a level of charge on the holding capacitor having regard to load demand.

Indeed the power conversion apparatus may be operative such that neither of the first and second paths carries current during a portion of a cycle of the high voltage AC signal to thereby hold a present state of the power conversion apparatus. More specifically at least one of: the second switch may open before the first switch closes; and the first switch may open before the second switch closes. Providing for neither of the first and second paths carrying current during a portion of the cycle in such a fashion may prevent closure of the second switch discharging the holding capacitor where a holding capacitor is comprised in the power conversion apparatus.

On the other hand, the portion of the cycle when neither of the first and second paths carries current may be of limited duration to limit the extent to which the voltage on the low voltage side of the high voltage capacitor excurses towards the voltage on the high voltage side of the high voltage capacitor. In certain forms, the first and second switches may be closed at the same time momentarily whereby the high voltage capacitor is loaded. Excursion of the voltage on the high voltage capacitor may be addressed thereby.

Each of at least one of the first and second switches may comprise two contacts and a control input, a change in voltage level at the control input being operative to change between conduction between the two contacts and lack of conduction between the two contacts. The power conversion apparatus may be configured such that the control signal is applied to the control input of the switch. The switch may comprise at least one active device having a control input. More specifically the switch may comprise at least one transistor, such as a pair of MOSFETs in a back to back configuration. Alternatively the switch may comprise a single MOSFET, the single MOSFET being formed by an appropriate semiconductor process such that the MOSFET is capable of supporting the highest voltages present in the power conversion apparatus. The power conversion apparatus may therefore be constituted at least in part in a CMOS integrated circuit. The at least one transistor may be comprised in a well whose voltage bias may be altered during operation to handle an increased voltage range. The power conversion apparatus may comprise a protection device, such a MOSFET acting as a cascade, in series with the at least one transistor. The power conversion apparatus may comprise a protection device, such as a parasitic diode to the substrate or well, in parallel with the at least one transistor. Such a switch normally has a lower voltage drop, for example less than 100 mV, than the like of a diode or Zener diode based switch.

As specified above, at least one of the first and second switches is operable in dependence on a control signal derived from the low voltage DC signal. The power conversion apparatus may therefore further comprise a switch control circuit which is operative to generate at least one control signal in dependence on a determination made in respect of a condition of at least one signal in the power conversion apparatus. The switch control circuit may be configured to measure at least one of a voltage and a current in the power conversion apparatus. The switch control circuit may be further configured to compare a measurement with a reference value and to generate a control signal in dependence on the comparison. According to an approach the switch control circuit may be operative to measure a voltage across the second switch. According to another approach the switch control circuit may be operative to measure a voltage across the first switch. According to yet another approach the switch control circuit may be operative to measure a direction of flow of current in the second path. According to another approach the switch control circuit may be operative to measure a voltage across the input, e.g. between live and neutral, such as by way of a potential divider. Each of these approaches may allow for determination of characteristics of the cycle of the high voltage AC signal such as in respect of when the cycle is in the positive going part or in the negative going part. The switch control circuit may be operative to determine when a switch is opened and closed. The switch control circuit may be configured to measure a voltage at the output stage, to compare the measured voltage with a reference value and to determine at least one of a switching duty cycle and a switch state in dependence on the comparison. The comparison may involve hysteresis to improve stability or reduce switching frequencies with the trade-off of ripple. The switch control circuit may thus be operative to control the voltage at the output stage to a desired level and within a desired range of ripple. The power conversion apparatus may be configured such that the second switch is operable in dependence on a control signal derived from the low voltage DC current signal. Operation of the second switch in this fashion may provide the advantage compared with the like of a Zener diode of improving upon efficiency when a load is drawing less than the maximum power available at the output stage by allowing for control of the second switch in accordance with load demand. The capability to control at least one of the first and second switches and knowledge of the phase of the high voltage AC signal may allow for regulation of the low voltage DC signal to advantageous effect. For example control may be effected to elevate the level of the low voltage DC signal to allow for a reduction in the size of the holding capacitor. By way of further example, control may be effected to elevate the level of the low voltage DC signal to take account of a period when charge availability is minimal or zero, i.e. in a dead period, such as at or around a peak or a trough of the high voltage AC signal. The level of the low voltage DC signal may be elevated for a relatively short period of time only whereby the elevated level may be such that lifetime requirements for the power conversion apparatus are still met. An elevated low voltage DC signal may enable the holding capacitor to continue to deliver power during a dead period and such that the level of the low voltage DC signal does not drop too low.

In a first embodiment the power conversion apparatus may be configured in dependence on when the first switch is operative such that the first path carries current in one of positive and negative going parts only of the high voltage AC signal. More specifically the first path may carry current in a positive going part only of positive and negative going parts of the high voltage AC signal. In addition the power conversion apparatus may be configured in dependence on when the second switch is operative such that the second path carries current in negative and positive going parts of the high voltage AC signal. When the first path carries current in the positive going part only of the high voltage AC signal, the power conversion apparatus may be configured such that the second path carries current in negative going parts of the high voltage AC signal. When the first switch is operative such that the first path carries current in a portion of one of positive and negative going parts only, the power conversion apparatus may be configured such that the second path carries current in the one of the positive and negative going parts when the first path is not carrying current. When the first path carries current in a portion of the positive going part, the second path may, for example, carry current in another portion of the positive going part as well as in the negative going part.

In the first embodiment the power conversion apparatus may comprise solely one switch in the first path, i.e. the first switch, and solely one switch in the second path, i.e. the second switch. As specified above, at least one of the first and second switches is operative in dependence on a control signal derived from the low voltage DC current signal. In a first form the first switch may comprise a diode. The first switch may therefore be operative in dependence on voltage levels at the anode and cathode of the diode and without dependence on the control signal. The diode may be disposed in the power conversion apparatus to conduct and thereby provide for the first path carrying current in at least a portion of the positive going part of the high voltage AC signal. The anode of the diode may be disposed closer to the high voltage capacitor than the cathode of the diode. The second switch may comprise two contacts and a control input and a change in voltage level at the control input may be operative to change between conduction between the two contacts and lack of conduction between the two contacts. Otherwise the second switch may be of a form and function as described above. In a second form of the first embodiment each of the first and second switches may each comprise two contacts and a control input with a change in voltage level at the control input being operative to change between conduction between the two contacts and lack of conduction between the two contacts. Otherwise each of the first and second switches may be of a form and function as described above. Power conversion apparatus in which the first and second switches are both operable in dependence on a control signal may provide for an appreciable reduction in the size of the high voltage capacitor on account of an improvement in the tolerance of the low voltage DC signal and a lower voltage drop over the first switch. A tolerance of, for example, a few percent may be achieved compared with the known Zener diode and diode circuit for which a tolerance of more than 20% is often required.

The present inventors have appreciated that a further improvement in power output and efficiency may be gained by using the positive going part and the negative going part of the high voltage AC signal rather than one of the positive and negative going parts. Therefore and according to a second embodiment the power conversion apparatus may be configured such that the first path carries current in both the positive going part and the negative going part. More specifically the power conversion apparatus may comprise an intermediate energy storing component and third, fourth and fifth switches which are each operable in dependence on a control signal derived from the low voltage direct current signal. Each of the third, fourth and fifth switches may comprise two contacts and a control input with a change in voltage level at the control input being operative to change between conduction between the two contacts and lack of conduction between the two contacts. The intermediate energy storing component may comprise one of an intermediate capacitor and an intermediate inductor. The intermediate energy storing component may be disposed in series between the high voltage capacitor and the output stage such as in the high side of the power conversion apparatus.

The power conversion apparatus may be configured such that a third path comprising the intermediate energy storing component may carry current during a first portion of one of the positive and negative going parts of the high voltage AC signal. More specifically the intermediate energy storing component may store charge during the negative going part. The third switch may be connected at a first end to a first end of the intermediate energy storing component which is closer of first and second ends of the intermediate energy storing component to the output stage and at a second end to a low side of the power conversion apparatus. Where the intermediate energy storing component is an intermediate capacitor, the fourth switch may be connected at a first end to a second end of the intermediate capacitor and at a second end to a low side of the power conversion apparatus. Where the intermediate energy storing component is an intermediate inductor, the fourth switch may be connected at a first end to the second end of the intermediate inductor and at a second end to the output stage. The fifth switch may be connected at a first end to the first end of the intermediate energy storing component and at a second end to the output stage. The fifth switch may therefore be in series between the intermediate energy storing component and the output stage. Where the power conversion apparatus comprises a holding capacitor, an end of the holding capacitor may be connected to the second end of the fifth switch. The third path may carry current upon closing of the first and third switches whereby the intermediate energy storing component stores energy received from the input. Thereafter the first and third switches may open and the fourth and fifth switches may close where the intermediate energy storing component is an intermediate capacitor or the third and fourth switches may close where the intermediate energy storing component is an intermediate inductor whereby charge flows from the intermediate energy storing component to the output stage. Where the power conversion apparatus comprises a holding capacitor, charge may flow from the intermediate energy storing component to the holding capacitor. The first, third, fourth and fifth switches may be operated such that they all close and open at least once during one of the positive and negative going parts of the cycle. More specifically the first, third, fourth and fifth switches may be operated at a frequency at least 10 times, 100 times, 1000 times, 10000 times, 100000 times or 1000000 times higher than the frequency of the high voltage AC signal.

The power conversion apparatus may further comprise a sixth switch which is connected at a first end to the second end of the intermediate energy storing component and at a second end to the output stage where the intermediate energy storing component is an intermediate capacitor. Where the intermediate energy storing component is an intermediate inductor the sixth switch is connected at a first end to a second end of the intermediate inductor and at a second end to a low side of the power conversion apparatus. During the other of the positive and negative going parts, the first and fifth switches may close whereby the intermediate energy storing component stores energy received from the input. Where the power conversion apparatus comprises a holding capacitor, the holding capacitor may also store charge. Thereafter the first and fifth switches may open and the third and sixth switches may close stage where the intermediate energy storing component is an intermediate capacitor or the fifth and sixth switches may close where the intermediate energy storing component is an intermediate inductor whereby charge flows from the intermediate energy storing component to the output stage. Where the power conversion apparatus comprises a holding capacitor, charge may flow from the intermediate energy storing component to the holding capacitor. The first, third, fifth and sixth switches may be operated such that they all close and open at least once during the other of the positive and negative going parts of the cycle. More specifically the first, third, fifth and sixth switches may be operated at a frequency at least 10 times, 100 times, 1000 times, 1000 times, 10000 times, 100000 times or 1000000 times higher than the frequency of the high voltage AC signal. The efficiency of power conversion apparatus depends on power dissipation in the input to the power conversion apparatus, which is a function of the reactance of the high voltage capacitor and the resistance of the inrush resistor where such is present, and the voltage dropped across the second switch. A reduction in the capacitive reactance and in the voltage drop in the second embodiment of the present invention may provide for a significant improvement in efficiency. The power conversion apparatus may be configured such that the second switch is operative as described above, such as when there is no need to charge the holding capacitor or in dead periods. In certain circumstances the second switch may be operative to clamp the high voltage capacitor while the intermediate energy storing component is charging the holding capacitor.

Where the intermediate energy storing component is an intermediate capacitor, the first and third to sixth switches and the intermediate capacitor may constitute a first path arrangement. In certain forms, the power conversion apparatus may comprise plural first path arrangements, such as two first path arrangements. The plural first path arrangements may be operative out of phase with each other.

According to a first approach each of the plural first path arrangements may comprise a different holding capacitor. The power conversion apparatus may therefore comprise plural first path arrangements with each first path arrangement comprising a holding capacitor. The power conversion apparatus may be configured such that each of the plural first path arrangements provides a different low voltage DC signal. For example the power conversion apparatus may be configured such that one first path provides a positive low voltage DC signal and another second path provides a negative low voltage DC signal. According to a second approach each of the plural first path arrangements may comprise the same holding capacitor. The plural first path arrangements may therefore be operative to charge one holding capacitor.

Having plural such first path arrangements may provide for smoother transfer of power to the holding capacitor. By appropriate phased control of one first path arrangement relative another first path arrangement significant change in the voltage level on the high voltage capacitor side of the first path arrangements may be minimised.

Where the intermediate energy storing component is an intermediate inductor, the intermediate inductor and the first and third to sixth switches may constitute a first path arrangement. In certain forms, the power conversion apparatus may comprise plural first path arrangements, such as two first path arrangements. Each first path arrangement may comprise a different intermediate inductor and different fourth and fifth switches at least of the first and third to sixth switches. The plural first path arrangements may be operative out of phase with each other. According to a first approach each of the plural first path arrangements may comprise a different holding capacitor. The power conversion apparatus may therefore comprise plural first path arrangements with each first path arrangement comprising a holding capacitor. The power conversion apparatus may be configured such that each of the plural first path arrangements provides a different low voltage DC signal. According to a second approach each of the plural first path arrangements may comprise the same holding capacitor. The plural first path arrangements may therefore be operative to charge one holding capacitor. In one form, each of the plural first path arrangements may comprise a different intermediate inductor and different fourth and fifth switches with the first, third and sixth switches being common to the plural first path arrangements. In another form, each of the plural first path arrangements may comprise a different intermediate inductor and different first and third to sixth switches. The number of first path arrangements may depend on the ratio of the voltage between the input side of the intermediate inductor and the low side to the voltage at the output stage with the ratio having a bearing on the ripple present at the input or output stage. Where the ratio is greater increasing the number of first path arrangements may reduce the ripple.

The power conversion apparatus may further comprise a DC-DC converter and more specifically a low voltage DC-DC converter. The DC-DC converter may be electrically coupled to the output stage. The DC-DC converter may be configured to provide plural low voltage DC supply signals. Where the power conversion apparatus comprises a holding capacitor, the DC-DC converter may be operative to allow for greater ripple at the output from the power conversion apparatus whereby a holding capacitor of lower capacitance may be used. Alternatively or in addition, the power conversion apparatus may further comprise a switching converter. The switching converter may be electrically coupled to the output stage. The switching converter may be configured to provide for increased current at reduced voltage from the power conversion apparatus.

The power conversion apparatus may be configured to determine a condition of the high voltage AC signal and to provide control data in dependence on the determined condition. More specifically the power conversion apparatus may be configured to determine a fault condition, such as a brownout or sag (i.e. loss or reduction in amplitude of a single phase). The power conversion apparatus may comprise a control data output, which may be coupled to a load, and the control data may be made available at the control data output. A load may therefore be controlled in dependence on the control data, for example, to enter a low power consumption state. Alternatively or in addition the power conversion apparatus may be configured to identify a portion of a cycle of the high voltage AC signal and to provide control data in dependence thereon. For example the power conversion apparatus may be configured to identify a dead period of the cycle or a period of high rate of change of the cycle. The control data may be configured accordingly such that when it is provided to a load the load is operative to vary its power demand. The power demand may be varied to, for example, switch a relay comprised in the load or transmit a packet from a transceiver comprised in the load.

The power conversion apparatus may be configured to receive control data from a load and to control its operation in dependence on the received control data. When a load is about to enter a low power state or is about to draw an increased level of power the control data may be configured accordingly and such that the power conversion apparatus is controlled appropriately. For example and where the load is about to enter a low power state, the power conversion apparatus may be operative to delay or skip releasing the high voltage capacitor from ground. By way of another example and where the load is about to draw an increased level of power, the power conversion apparatus may be operative to increase the level of charge on the holding capacitor. The switching of a relay or a Silicon Controlled Rectifier (SCR) normally requires a momentary increase in power. Furthermore the increased level of power can often be determined in advance. Also a load normally knows that a relay or SCR is about to be switched. The power conversion apparatus may therefore be operative to charge the holding capacitor by an amount corresponding to the upcoming increase in power demand with the excess charge on the holding capacitor being used shortly afterwards upon switching of the relay or SCR. A relay or SCR is often switched around the zero-crossing point of the high voltage AC signal. The zero-crossing point of the high voltage AC signal is also when the peak level of current is delivered from the high voltage capacitor of the power conversion apparatus. The approach of increasing the level of charge on the holding capacitor according to the present invention may therefore be advantageous from the perspectives of load power requirement and power delivery capability. The transmission of data by way of a wired or wireless medium often requires a momentary increase in power. The level of power required for transmission is usually several times higher than the level of power required for reception or several orders of magnitude higher than the level of power required for idling. The power conversion apparatus may therefore be operative to charge the holding capacitor by an amount corresponding to the upcoming increase in power demand with the excess charge on the holding capacitor being used shortly afterwards for data transmission. Elevation of the charge on the holding capacitor may be used to advantageous effect where a communications circuit comprised in the load is time aligned with a beacon that is aligned to the zero-crossing point of the high voltage AC signal. The charge on the holding capacitor may be elevated for a short period of time on account of an upcoming increase in power demand being momentary. Many reliability criteria restrict operating voltage levels on a time related basis whereby a momentary elevation in charge on the holding capacitor has minimal adverse effect on reliability criteria. The present approach may provide for a momentary increase in the level of power drawn from the power conversion apparatus at the cost of an increase in the level of ripple present in the low voltage DC signal.

The power conversion apparatus may comprise a communications circuit which is operable to provide for at least one of transmission and reception of data by way of the input to the power conversion apparatus. Where the input to the power conversion apparatus is coupled to a mains supply, the communications circuit may provide for at least one of transmission of data to and receipt of data from the mains supply. The communications circuit may be powered from the low voltage DC signal. The power conversion apparatus may be configured to selectively couple an output from or input to the communications circuit to a part of the power conversion apparatus. More specifically the power conversion apparatus may be configured to selectively couple the output from or input to the communications circuit to the low voltage side (or output stage side) of the high voltage capacitor. The power conversion apparatus may comprise a communications switch, which is a switch of controllable form as described elsewhere herein. The communications switch may be connected at one end to the output from or input to the communications circuit and may be connected at another end to the part of the power generation apparatus, e.g. to the output stage side of the high voltage capacitor. The power conversion apparatus may be configured such that the communications switch is closed when the first and second switches are open. The power conversion apparatus may be configured such that the communications circuit is operative to communicate around the zero-crossing point of the high voltage AC signal. The zero-crossing point is a period of maximal power transfer whereby the holding capacitor may readily recharge. Examples of appropriate communication protocols are X10 and lnsteon amongst others.

The power conversion apparatus may further comprise an inrush resistor. More specifically the inrush resistor may be disposed in series with the input, such as in the high side of the input. The inrush resistor may be constituted by a high wattage resistor and may serve to limit the current when the power apparatus is plugged in or when it is subject to a surge event. Alternatively or in addition the power conversion apparatus may further comprise a Negative Temperature Coefficient resistor or a thermistor in series to minimise the inrush current but such that the current is not limited when the power conversion apparatus is operating and warm. Alternatively or in addition the power conversion apparatus may further comprise a discharge resistor which is connected across the high voltage capacitor. Alternatively or in addition the power conversion apparatus may further comprise a varistor, such a metal oxide varistor, which is connected between the high and low sides of the power conversion apparatus with one end of the varistor being connected on the output stage side of the high voltage capacitor whereby the varistor is in parallel with the second path.

A fundamental frequency of the high voltage AC signal may be less than 500 Hz, such as a frequency of substantially 60 Hz or substantially 50 Hz for domestic mainsor a frequency of substantially 400 Hz for mains in ships or aircraft. The high voltage capacitor may be of a value of no more than 10 pF, 100 pF, 1 nF, 10 nF, 47 nF, 100 nF, 220 nF, 470 nF, 1 μF, 4.7 μF or 10 μF. The high voltage capacitor may be an X or Y type or other capacitor. The high voltage capacitor may be formed from a parasitic. The high voltage capacitor may comprise plural, series connected lower voltage capacitors. The high voltage AC signal may be at least 100 Volts RMS, 200 Volts RMS, 300 Volts RMS or 400 Volts RMS. The voltage of the low voltage DC signal may be no more than half the peak voltage of the high voltage AC signal. The low voltage DC signal may be around 24 Volts, 15 Volts, 12 Volts, 5 Volts, 3.3 Volts, 2.5 Volts, 1.8 Volts, 1.2 Volts or 0.9 Volts.

The power conversion apparatus may comprise a load circuit, such as a load comprising the like of communications circuitry, an SCR or a relay as described above. The load circuit may be comprised in a home control network. The load circuit may comprise an energy measurement arrangement such as by way of a shunt attached to live or neutral. The load circuit may comprise a DIN meter, PANEL meter, Electronic meter or Home Energy Monitor. The load circuit may comprise an electrical fault detecting capability such as earth/ground fault, arc fault, residual current detection, overload protection or circuit breaker. The load circuit may be low voltage switch gear. The load circuit may comprise a gas or smoke detector arrangement. The load circuit may comprise a presence or intruder alarm arrangement. The load circuit may be configured to control a primary power supply of an appliance, information technology device, multimedia device or universal power supply. The load circuit may be a secondary power supply that is used to control a primary power supply when a device is in standby or power saving mode.

The power conversion apparatus described above may be used in applications where there is more than one live phase in addition to where there is live and neutral. According to a second aspect of the present invention there is therefore provided a power conversion arrangement comprising plural power conversion apparatus according to the first aspect of the present invention.

According to a first approach, the power conversion arrangement may be configured such that the same high voltage capacitor is shared between the plural power conversion apparatus and each power conversion apparatus is operative with a different one of plural phases. A different load may therefore be supplied from each power conversion apparatus. By way of example according to this configuration one power conversion apparatus may be coupled to a neutral phase conductor of a high voltage AC supply and the other power conversion apparatus may be coupled to a live phase conductor of the high voltage AC supply.

According to a second approach, the power conversion arrangement may be configured such that each of the plural power conversion apparatus is operative with a different high voltage capacitor and the plural power conversion apparatus are operative with the same phase. By way of an example according to this configuration, one power conversion apparatus may be coupled to a neutral phase of a high voltage AC supply with a high voltage capacitor coupled to one live phase, and another power conversion apparatus may be coupled to the same neutral phase with a high voltage capacitor coupled to a different live phase.

According to a third approach, the plural power conversion apparatus may be operative with the same phase and the power conversion arrangement may be configured such that one of the power conversion apparatus is operative to provide a positive voltage signal and another of the power conversion apparatus is operative to provide a negative voltage signal. The power conversion arrangement may thus be configured to provide both positive and negative supply rails. The power conversion arrangement may further comprise a rectifier arrangement disposed between each power conversion apparatus and a shared high voltage capacitor. One of the two rectifier arrangements may be configured to provide for conduction during a positive part of the waveform cycle and the other of the two rectifier arrangements may be configured to provide for conduction during a negative part of the waveform cycle.

The power conversion arrangement may comprise a delta configuration of three pairs of power conversion apparatus in which each power conversion apparatus is coupled to a different phase of a three phase supply and in which adjacent power conversion apparatus of different pairs share the same high voltage capacitor. The delta configuration may therefore comprise three high voltage capacitors. Each of the three pairs of power conversion apparatus may supply a different load. Each load may therefore be supplied with power from two different phases. This may provide the advantage of redundancy whereby each load may be supplied by one phase in the event of failure of the other phase. In certain forms, the power conversion apparatus may be operative to carry current in their first paths in both the positive and negative going parts of the cycle. Where the power conversion arrangement comprises a holding capacitor in each pair of power conversion apparatus, the holding capacitors may be smaller in size compared with configurations in which a power conversion apparatus receives power from a single phase. This may provide the advantage of allowing for the use of a capacitor technology that is 'dry' such as ceramic as opposed to 'wet' such as electrolytic. Dry capacitor technology has more favourable lifetime reliability than wet capacitor technology. This is because the use of three phases may mean that there is, in effect, no dead period. In certain applications, circumstances may be such that there is no need for holding capacitors. The power conversion arrangement may therefore lack a holding capacitor.

The power conversion arrangement may comprise a star configuration comprising at least three power conversion apparatus. Each of three power conversion apparatus may be coupled to a respective high voltage capacitor with each high voltage capacitor being coupled to a different live phase. The three power conversion apparatus may be coupled to the neutral phase. Each phase leg of the power conversion arrangement may comprise a pair of power conversion apparatus in a back to back configuration with a high voltage capacitor therebetween. The delta and star configurations may be combined in the same apparatus. The power conversion arrangement may comprise, by way of another alternative, two live phases and neutral in a split phase configuration. Each of the two live phase legs of the power conversion arrangement may comprise a pair of power conversion apparatus in a back to back configuration with a high voltage capacitor therebetween. The split phase configuration may further comprise a first power conversion apparatus coupled to a first one of the two live phases and a high voltage capacitor and a second power conversion apparatus coupled to a second one of the two live phases and the high voltage capacitor.

Several different combinations of multi-phase configurations may be provided in which the high voltage capacitor is shared and there is a different load and in which there are different high voltage capacitors and a shared load. Such different combinations may be employed to maximise benefits but at the expense of additional components. For example a multi phase and neutral arrangement may be configured to maximise the power available with respect to neutral by providing plural power conversion apparatus in parallel on neutral with each power conversion apparatus drawing current from a respective high voltage capacitor relative to a respective phase. This approach may be beneficial in respect of maximising the power on neutral, which can often comprise additional electronics in a multi phase arrangement. Also this approach may afford a reduction in the requirement for a holding capacitor on account of the available power profile being the sum of the plural phases. By way of another example plural power conversion apparatus may share the high voltage capacitor relative to their respective phases whereby power may be provided to plural loads without an additional high voltage capacitor. By way of further example, the delta and star configurations described above may be combined in the same power conversion arrangement with or without a back to back configuration of power conversion apparatus for the star configuration.

The power conversion arrangement may be configured such that the plural phases comprise at least one of: a single live phase and a neutral phase; two live phases and a neutral phase; two live phases with no neutral phase; three live phases and a neutral phase in a delta configuration; three live phases with no neutral phase in a delta configuration; three live phases and a neutral phase in a star configuration; three live phases with no neutral phase in a star configuration; and more than three live phases and a neutral phase.

Further embodiments of the second aspect of the present invention may comprise one or more features of the first aspect of the present invention.

The present inventors have appreciated that the sharing of a holding capacitor between two power conversion apparatus is of wider applicability than hitherto described. According to a third aspect of the present invention there is therefore provided a power conversion arrangement comprising plural power conversion apparatus, each power conversion apparatus being configured to receive a high voltage alternating current signal at an input and to provide in dependence thereon a low voltage direct current signal from an output stage, the power conversion apparatus comprising: a main path comprising a high voltage capacitor in series with the input; a first path operative to carry current carried by the main path one of a positive going part and a negative going part of the high voltage alternating current signal; a second path operative to carry current carried by the main path in the other of a positive going part and a negative going part of the high voltage alternating current signal; and first and second switches which are operative to determine when a respective one of the first and second paths carries current, in which the high voltage capacitor is shared between the plural power conversion apparatus and the first and second switches of at least one of the power conversion apparatus are operable in the absence of control signals.

The power conversion arrangement may be configured to be operative from a multi-phase supply as described above. The first and second switches of at least one of the power conversion apparatus are operable in the absence of control signals, such as control signals derived from the low voltage DC signal. The first and second switches may therefore be operative of themselves and in dependence on the relative voltages across each switch. More specifically the first switch may be a diode. Alternatively or in addition the second switch may be a Zener diode.

Further features of the third aspect of the present invention may comprise one or more further features of the first or second aspect of the present invention.

According to a further aspect of the present invention there is provided power conversion apparatus configured to receive a high voltage alternating current signal at an input and to provide in dependence thereon a low voltage direct current signal from an output stage, the power conversion apparatus comprising: a main path comprising a high voltage capacitor in series with the input; a first path operative to carry current carried by the main path in at least one of a positive going part and a negative going part of the high voltage alternating current signal; a second path operative to carry current carried by the main path in a positive going part and a negative going part of the high voltage alternating current signal; and first and second switches which are operative to determine when a respective one of the first and second paths carries current, the output stage receiving current flowing in the first path. Embodiments of the further aspect of the present may comprise one or more features of any previous aspect of the present invention.

This summary is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 2:
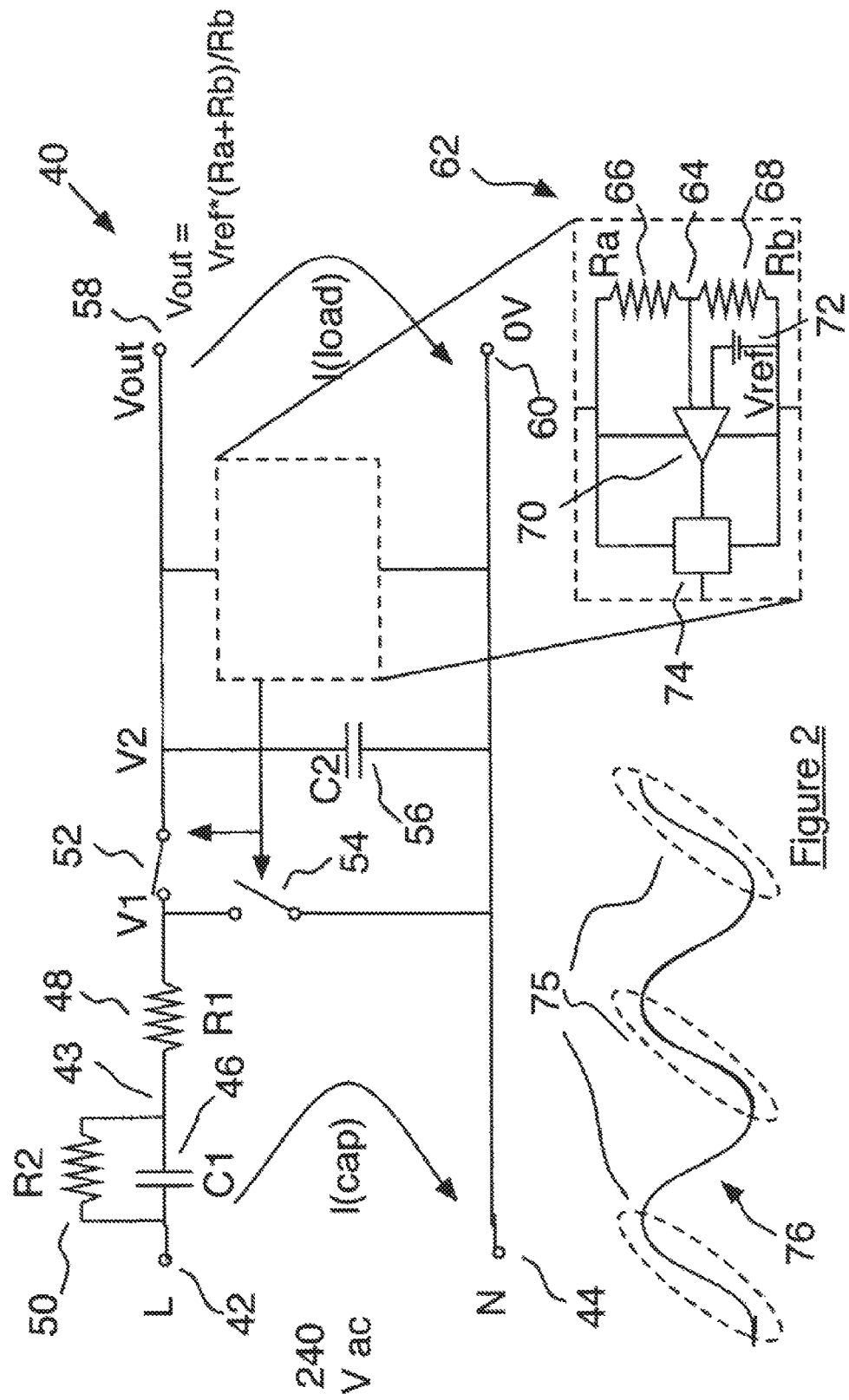
FIG. 2 is a circuit diagram of a capacitive transformerless power conversion apparatus according to a first embodiment of the present invention.

A capacitive transformerless power conversion apparatus 40 according to a first embodiment of the present invention is shown in circuit diagram form in FIG. 2. The power conversion apparatus 40 comprises a live connection 42 and a neutral connection 44 which are connected respectively to the live and neutral conductors of a 240 V AC electricity supply. A capacitor 46 (which constitutes a high voltage capacitor), such as an X-type, Y-type, or other capacitor, and a resistor 48 are in series with the live connection 42 with a connection between the capacitor 46 and the resistor 48 being represented by reference numeral 43. In certain forms, the high voltage capacitor is constituted by plural series connected lower voltage capacitors. The resistor 48 is present to limit the inrush current to the capacitor 46 if the power conversion apparatus is connected to the mains at a point in the mains cycle other than the zero crossing or in the event of a mains surge. A discharge resistor 50 is connected across the capacitor 46. The power conversion apparatus 40 further comprises a first switch 52 in series with the capacitor 46 and the resistor 48. The power conversion apparatus 40 also comprises a second switch 54 and a holding capacitor 56. The first terminal of the second switch 54 is electrically connected between the resistor 48 and the first terminal of the first switch 52 and the second terminal of the second switch 54 is electrically connected to the neutral connection 44. Each of the first and second switches 52, 54 is constituted by a pair of MOSFETs in a back to back configuration with a control input of the switch being constituted by the gates of the MOSFETs The pair of MOSFETs is comprised in a well whose voltage bias is altered during operation to handle an increased voltage range. In an alternative form each of the first and second switches 52, 54 is constituted by a single MOSFET.

The single MOSFET is formed by an appropriate semiconductor process such that the MOSFET is capable of supporting the highest voltages present in the power conversion apparatus 40. The power conversion apparatus 40 also comprises a first protection device (not shown) in the form of a MOSFET acting as a cascade in series with the pair of MOSFETs and a second protection device (not shown) in the form of a parasitic diode to the substrate or well in parallel with the pair of MOSFETs. The holding capacitor 56 is electrically connected between the second terminal of the first switch 52 and the neutral connection 44.

The power conversion apparatus 40 yet further comprises an output stage. The output stage comprises a positive voltage output connection 58 at the second terminal of the first switch 52 and a low voltage output connection 60 at the neutral side of the holding capacitor 56. The low voltage output connection 60 is directly electrically connected to the neutral connection 44. In other embodiments there is an electrical component between the low voltage output connection 60 and the neutral connection 44. In such other embodiments, for example, the resistor 48 may be in the neutral leg instead of the live leg. Returning to the present embodiment, the capacitor 46 and the resistor 48 lie in a main path of the power conversion apparatus. The first switch 52 lies in a first path of the power conversion apparatus and the second switch 54 lies in a second path of the power conversion apparatus. The power conversion apparatus 40 also comprises a switch control circuit 62 which is powered from the output stage of the power conversion apparatus. The switch control circuit 62 is operative to generate control signals to control, i.e. to close and open, the first and second switches 52, 54. The switch control circuit 62 comprises a voltage divider arrangement 64 comprising a first resistor 66, Ra, and a second resistor 68, Rb, in series. The switch control circuit 62 also comprises an operational amplifier 70, a voltage reference 72 and a digital control circuit 74. The inverting input of the operational amplifier 70 is electrically connected between the first and second resistors 66, 68 and the non-inverting input of the operational amplifier 70 is electrically connected to the voltage reference 72. The digital control circuit 74, which generates control signals for the first and second switches 52, 54, receives an input from the operational amplifier 70. The switch control circuit 62 is operative to control the duty cycle of the first and second switches 52, 54 to set the voltage at the output stage, Vout, to a desired level which is determined in accordance with the ratio of the first and second resistors 66, 68 and the value of the voltage reference 72,Vret, whereby Vout=Vref*(Ra+Rb)/Rb. Although not shown in FIG. 2, the switch control circuit 62 is further configured to determine when the first and second switches 52, 54 are opened and closed having regard to the cycle of the mains supply to the power conversion apparatus 40. More specifically the switch control circuit 62 is configured to at least one of: measure a voltage across the first switch 52; measure a voltage across the second switch 54; measure a voltage across the input, e.g. between live and neutral; and measure a current flowing through the second switch 54. The switch control circuit 62 therefore further comprises appropriate voltage and current sensors. Measurement of the voltage across the input, i.e. between the live connection 42 and the neutral connection 44, provides for determination of the zero-crossing point of the mains signal.

Operation of the first embodiment of the power conversion apparatus 40 will now be described with reference to FIG. 2. The switch control circuit 62 is operative to determine when the mains supply is in a positive going part as indicated by the circled parts 75 in the waveform 76 of FIG. 2. When the mains supply is in a positive going part, the switch control circuit 62 is operative to generate control signals to close the first switch 52 and open the second switch 54 if the latter is not already open having regard to the duty cycle determined by the switch control circuit 62. Normally and depending on load requirements the first switch 52 is opened and closed one time or several times when the mains supply is in the positive going part.

Upon closing of the first switch 52 current is conveyed by way of the first path to either charge the holding capacitor 56 or be drawn by a load connected to the output stage. Upon initial start-up of the power conversion apparatus 40 and assuming little or no drain by a load, the first switch 52 is closed for most of the positive going part of the mains cycle to provide a maximum rate of charging of the holding capacitor 56. As the holding capacitor 56 charges up the first switch 52 is closed for less of the positive going part of the mains cycle. If the holding capacitor 56 is fully charged then the first switch 52 may not close at all during one or more positive going parts of the mains cycle. On the other hand, if power demand from the load increases so as to drain the holding capacitor 56 the length of the closed time of the first switch 52 is increased during the positive going part of the mains cycle. The switch control circuit 62 also operative to close the second switch 54 when a clamping action is required, i.e. to limit an extent to which the voltage at the first terminal of the first switch 52 excurses towards the live line voltage. The second switch 54 is therefore closed on an intermittent basis and primarily during the negative going part of the mains cycle when the power conversion apparatus is under load. The second switch 54 also closes during the positive going part of the mains cycle at times when there is low load demand. The first switch 52 is open when the second switch 54 is closed and vice-versa. The first and second switches 52, 54 are operated such that they are not closed at the same time. More specifically the second switch 54 opens before the first switch closes 52 and the first switch 52 opens before the second switch 54 closes. In certain forms, the first and second switches 52, 54 are closed at the same time momentarily to reduce an extent of excursion of voltage on the capacitor 46. In an un-illustrated embodiment which is an alternative to the embodiment shown in FIG. 2, a negative low voltage DC supply is provided. In this alternative embodiment the capacitor 46 is in series with the low side of the input to the power conversion apparatus, i.e, the neutral connection 44. In addition the first and second switches 52, 54 are operative such that the holding capacitor 56 is charged in the negative going part of the mains cycle. The output from the power conversion apparatus is thus referenced to the live of the mains input.

In a further un-illustrated embodiment which is an alternative to the embodiment shown in FIG. 2, the power conversion apparatus further comprises a low voltage DC-DC converter. The low voltage DC-DC converter is connected between the holding capacitor 56 and the positive voltage output connection 58 and is configured to provide plural low voltage DC supplies.

In a yet further un-illustrated embodiment which is an alternative to the embodiment shown in FIG. 2, the power conversion apparatus further comprises a switching converter. The switching converter is connected between the holding capacitor 56 and the positive voltage output connection 58 and is configured to provide for increased current at reduced voltage from the power conversion apparatus.

A second embodiment of power conversion apparatus 90 will now be described with reference to FIG. 3. Features of the second embodiment in common with the first embodiment are indicated by common reference numerals and the reader's attention is directed to the description provided above with reference to FIG. 2 for a description of such common features. Features particular to the second embodiment 90 will now be described. The power conversion apparatus 90 comprises an intermediate capacitor 92, a third switch 94, a fourth switch 96, a fifth switch 98 and a sixth switch 100. In an alternative embodiment an intermediate inductor is used instead of the intermediate capacitor 92. Each of the third to sixth switches 94, 96, 98, 100 is of the same form as the first and second switches 52, 54. Although not shown in FIG. 3 the power conversion apparatus 90 comprises a switch control circuit which is adapted to generate control signals to open and close each of the third to sixth switches 94, 96, 98, 100. The intermediate capacitor 92 is connected in series between the first switch 52 and the output stage via switch 98. The third switch 94 is connected at a first end to a first end of the intermediate capacitor 92, which is closer of the first and second ends of the intermediate capacitor 92 to the output stage, and at a second end to the neutral connection 44. The fourth switch 96 is connected at a first end to the second end of the intermediate capacitor 92 and at a second end to the neutral connection 44. The fifth switch 98 is connected at a first end to the first end of the intermediate capacitor 92 and at a second end to the positive voltage output connection 58 of the output stage. The sixth switch 100 is connected at a first end to the second end of the intermediate capacitor 92 and at a second end to the positive voltage output connection 58 of the output stage.

Operation of the second embodiment of power conversion apparatus 90 will now be described with reference to FIG. 3. The second embodiment of power conversion apparatus 90 is operative to provide for charging of the holding capacitor 56 in dependence on current flow during both of the positive and negative going parts of the mains cycle. This in contrast with the first embodiment of power conversion apparatus 40 which is operative to provide for charging of the holding capacitor 56 in dependence on current flow during the positive going part only. During the negative going part of the mains cycle as determined by the switch control circuit, the switch control circuit is operative to generate control signals which close the first and third switches 52, 94 during a first phase and which close the fourth and fifth switches 96, 98 during a second phase. During each of the first and second phases all other switches are open. The switch control circuit is operative to change between the first and second phases at a frequency between 100 kHz and 100 MHz. Charge flows into the intermediate capacitor 92 during the first phase. Charge then flows from the intermediate capacitor 92 to the holding capacitor 56 during the second phase. During the positive going part of the mains cycle as determined by the switch control circuit, the switch control circuit is operative to generate control signals which close the first and fifth switches 52, 98 during a third phase and which close the third and sixth switches 94, 100 during a fourth phase. During each of the third and fourth phases all other switches are open. The switch control circuit is operative to change between the third and fourth phases at a frequency between 100 kHz and 100 MHz. Charge flows into the intermediate capacitor 92 and the holding capacitor 56 during the third phase. Charge then flows from the intermediate capacitor 92 to the holding capacitor 56 during the fourth phase. The present approach therefore provides for twice the charge during the positive going part compared with the first embodiment. Otherwise the second embodiment of power conversion apparatus 90 is operative in the same fashion as the first embodiment of power conversion apparatus 40. For example the switch control circuit is operative to change the duty cycle of switching from one of the first to fourth phases to the second switch 54 to maintain the voltage at the output stage at a desired level. Also the switch control circuit is operative to close the second switch 54 to limit an extent to which the voltage at the first terminal of the first switch 52 excurses towards the live line voltage.

Figure 3:
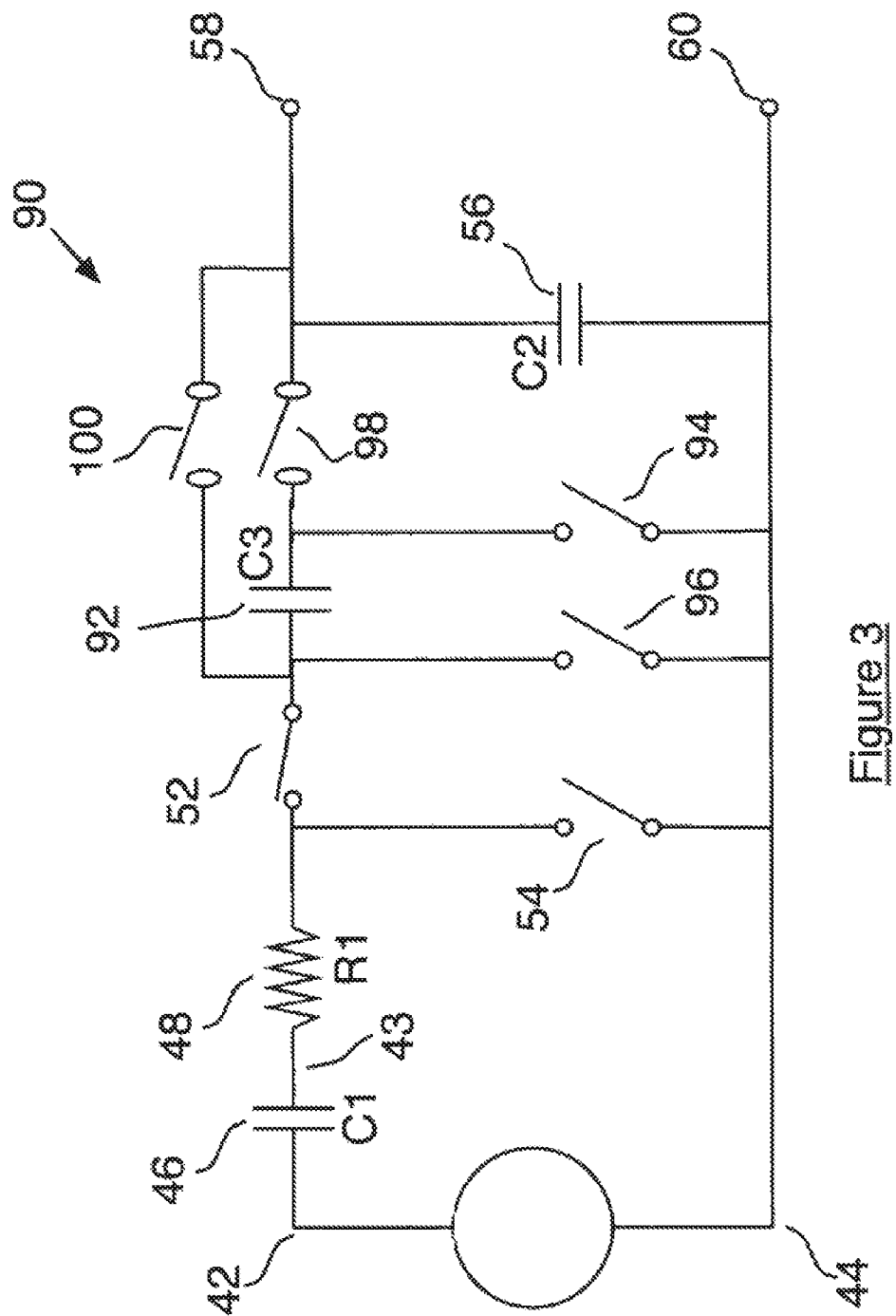
FIG. 3 is a circuit diagram of a capacitive transformerless power conversion apparatus according to a second embodiment of the present invention.

In the embodiment of FIG. 3 the first and third to sixth switches and the intermediate capacitor constitute a first path arrangement. In alternative, un-illustrated embodiments to the embodiment of FIG. 3 the power conversion apparatus comprises plural such first path arrangements. In one form the plural first path arrangements charge the same holding capacitor 56. Having plural such first path arrangements provides for smoother transfer of power to the holding capacitor. In another form each of the plural first path arrangements charges a different holding capacitor. In addition the switches of the first path arrangements are operative to provide for either different voltage levels of DC output or for a mix of positive and negative voltage DC outputs. The power conversion apparatus may therefore be configured to provide a differential power supply.

In an un-illustrated alternative embodiment to the embodiment shown in FIG. 3 the intermediate capacitor is replace with an intermediate inductor. The form of the first to sixth switches is unchanged with the exception of the sixth switch 100 being identified as the fourth switch and the fourth switch 96 being identified as the sixth switch. Operation of the embodiment comprising the intermediate inductor is the along the same lines as operation of the embodiment comprising the intermediate conductor having regard to the different identities of the fourth and sixth switches.

Considering the operation in more detail, during the negative going part of the mains cycle as determined by the switch control circuit, the switch control circuit is operative to generate control signals which close the first and third switches 52, 94 during a first phase and which close the third and fourth switches 94, 100 during a second phase. During each of the first and second phases all other switches are open. Energy flows into the intermediate inductor during the first phase. Energy then flows from the intermediate inductor to the holding capacitor during the second phase. During the positive going part of the mains cycle as determined by the switch control circuit, the switch control circuit is operative to generate control signals which close the first and fifth switches 52, 98 during a third phase and which close the fifth and sixth switches 98, 96 during a fourth phase. During each of the third and fourth phases all other switches are open. Energy flows into the intermediate inductor and the holding capacitor 56 during the third phase. Energy then flows from the intermediate inductor to the holding capacitor 56 during the fourth phase. Otherwise operation of the embodiment comprising the intermediate inductor is the same as operation of the embodiment comprising the intermediate capacitor.

With regard to the provision of plural first path arrangements in the embodiment comprising the intermediate inductor, in a first form each first path arrangement comprises a different intermediate inductor and different first and third to sixth switches. According to one approach the plural first path arrangements charge the same holding capacitor 56. According to another approach the plural first path arrangements charge different holding capacitors 56 to thereby provide either different voltage levels of DC output or a mix of positive and negative voltage DC outputs. In a second form, each first path arrangement comprises a different intermediate inductor and different fourth and fifth switches with the first, third and sixth switches being common to the plural first path arrangements. In the second form each first path arrangement further comprises a different holding capacitor whereby the second form is operative to provide plural DC outputs.

Figure 4A:
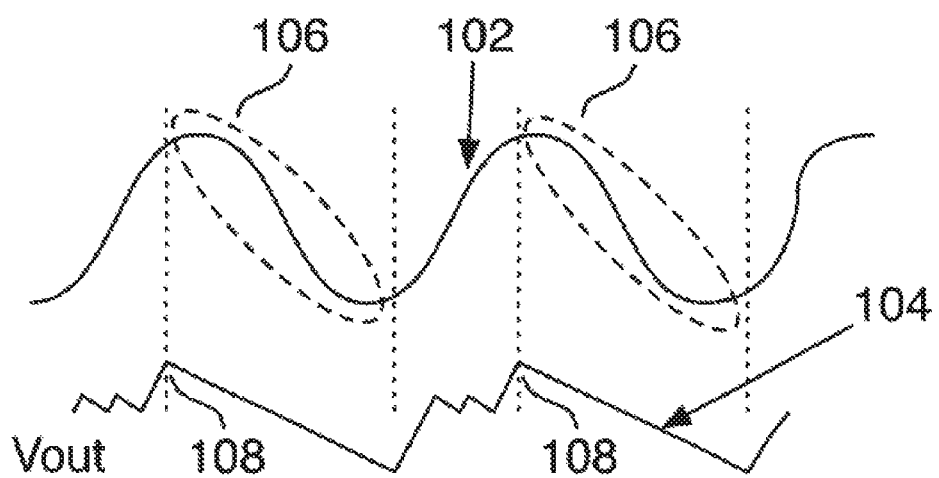
FIG. 4A shows signal waveforms in the first embodiment in which the output voltage is elevated.
Figure 4B:
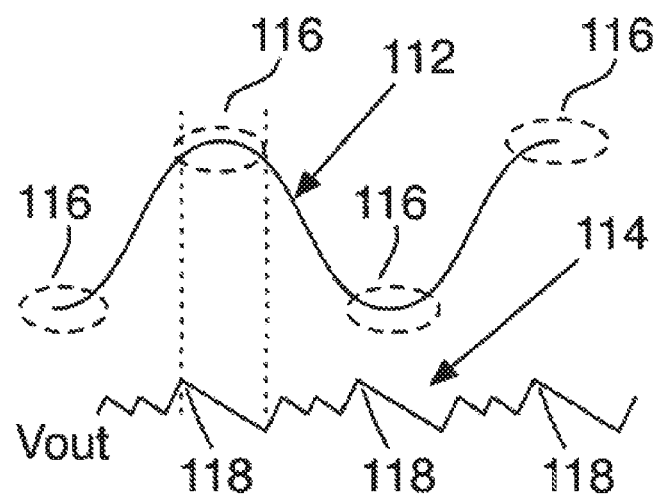
FIG. 4B shows signal waveforms in the second embodiment in which the output voltage is elevated.

Signal waveforms in the first embodiment are shown in FIG. 4A. The upper waveform 102 represents the mains signal and the lower waveform 104 represents the signal at the output stage from the power conversion apparatus 40. The upper waveform 102 has portions, namely dead periods 106, where there is no charging of the power conversion apparatus. The dead periods 106 are during the nearly flat and negative going parts of the mains signal when there is no charging of the holding capacitor 56. Charge lost from the holding capacitor 56 on account of load draw and leakage is not replenished the dead periods 106. The switch control circuit 62 is therefore operative to over-charge the holding capacitor 56 just before the start of a dead period such that the voltage at the output stage is higher 108 than the desired level to thereby compensate for lower charge availability during the following dead period 116.

Signal waveforms in the second embodiment are shown in FIG. 48. The upper waveform 112 represents the mains signal and the lower waveform 114 represents the signal at the output stage from the power conversion apparatus 90. The upper waveform 112 has portions, namely dead periods 116, where there is little or no charging of the power conversion apparatus. The dead periods are around the maximum and minimum points of the mains signal when the rate of change of the signal is low. Charge lost from the holding capacitor 56 on account of load draw and leakage is replenished at a slower rate during the dead periods. The switch control circuit 62 is therefore operative to overcharge the holding capacitor 56 just before the start of a dead period such that the voltage at the output stage is higher 118 than the desired level to thereby compensate for lower charge availability during the following dead period 116.

In un-illustrated forms of the first and second embodiments, the switch control circuit 62 is adapted to monitor the mains signal and to analyse the mains signal to determine its condition or to detect a fault condition, such as a brownout or loss of a single phase. The switch control circuit 62 is adapted to generate control data which is conveyed to a load connected to the power conversion apparatus 40, 90. The control data is configured such that the load is controlled to take action appropriate to a detected fault condition or a determined condition of the mains cycle. The control data may, for example, be configured to cause the load to enter a low power consumption state when a fault is detected. By way of another example, the control data may be configured to cause the load to increase its demand during parts of the mains cycle between the dead period and to decrease its demand during dead periods. In further un-illustrated forms of the first and second embodiments, the switch control circuit 62 is adapted to receive control data from a load and to control operation of the power conversion apparatus in dependence on the received control data. For example and where the load is about to enter a low power state, the control data is configured to cause the power conversion apparatus to delay releasing the capacitor 46 from the neutral connection 44. By way of another example and where the load is about to draw an increased level of power, the control data is configured to cause the power conversion apparatus to increase the level of charge on the holding capacitor 56.

Figure 5:
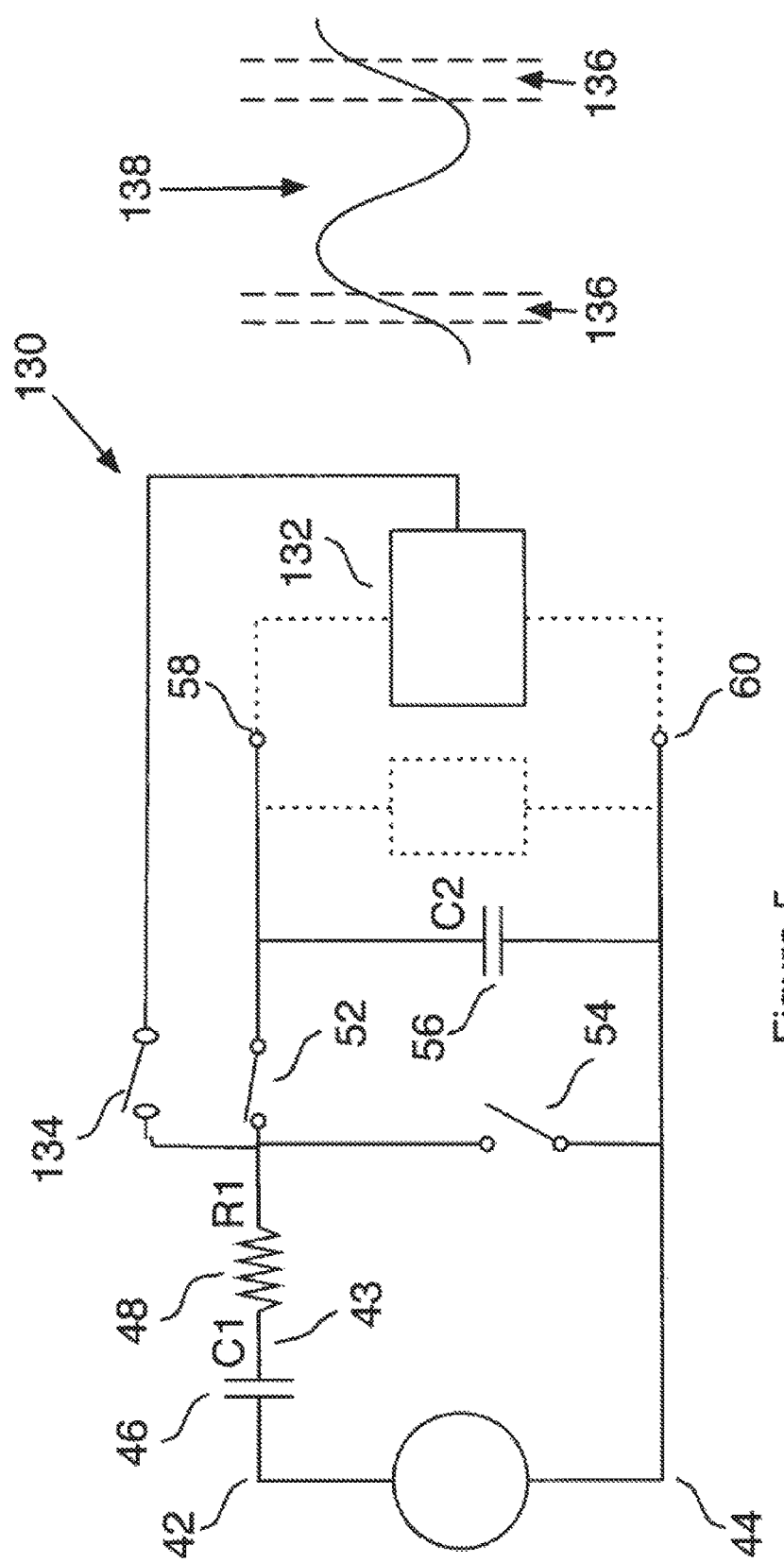
FIG. 5 is a circuit diagram of a capacitive transformerless power conversion apparatus comprising a communications circuit.

A capacitive transformerless power conversion apparatus 130 comprising a communications circuit is shown in circuit diagram form in FIG. 5. Features of the circuit of FIG. 5 in common with the first embodiment of FIG. 2 are indicated with common reference numerals and the reader's attention is directed to the description provided above with reference to FIG. 2 for a description of such common features. Features particular to the circuit 130 of FIG. 5 will now be described. It will be readily appreciated by the reader skilled in the art that the second embodiment of FIG. 3 may be re-configured without exercising any more than ordinary design skill such that it comprises the communications circuit of FIG. 5. The power conversion apparatus 130 of FIG. 5 comprises a communications circuit 132, which is operable to receive and transmit data at a communications circuit port, and a seventh switch 134. The seventh switch 134 is of the same form as the first and second switches 52, 54. The first terminal of the seventh switch 134 is electrically connected to the communications circuit port and the second terminal of the seventh switch 134 is electrically connected to the first terminal of the first switch 52 such that the second terminal of the seventh switch 134 connects between the first switch 52 and the resistor 48. The communications circuit 132 draws power from the output stage of the power conversion apparatus. Operation of the power conversion apparatus 130 of FIG. 5 will now be described. Prior to the reception of data by or transmission of data from the communications circuit 132, the switch control circuit is operative to close the seventh switch 134 and to open all other switches in the power conversion apparatus 136. The communications circuit 132 is then operative to generate communication data at its communications circuit port which is conveyed by way of the resistor 48 and the capacitor 46 to the mains supply for onward transmission to the like of a supervisory and control circuit. Alternatively communication data is received from the mains supply and is conveyed by way of the capacitor 46, the resistor 48 and the seventh switch 134 to the communications circuit port of the communications circuit 132. At other times 138, i.e. when there is no communication of data to or from the communications circuit 132, the seventh switch 134 is open and the other switches in the power conversion apparatus 130 are operative as described above with reference to FIG. 2.

Figure 6A:
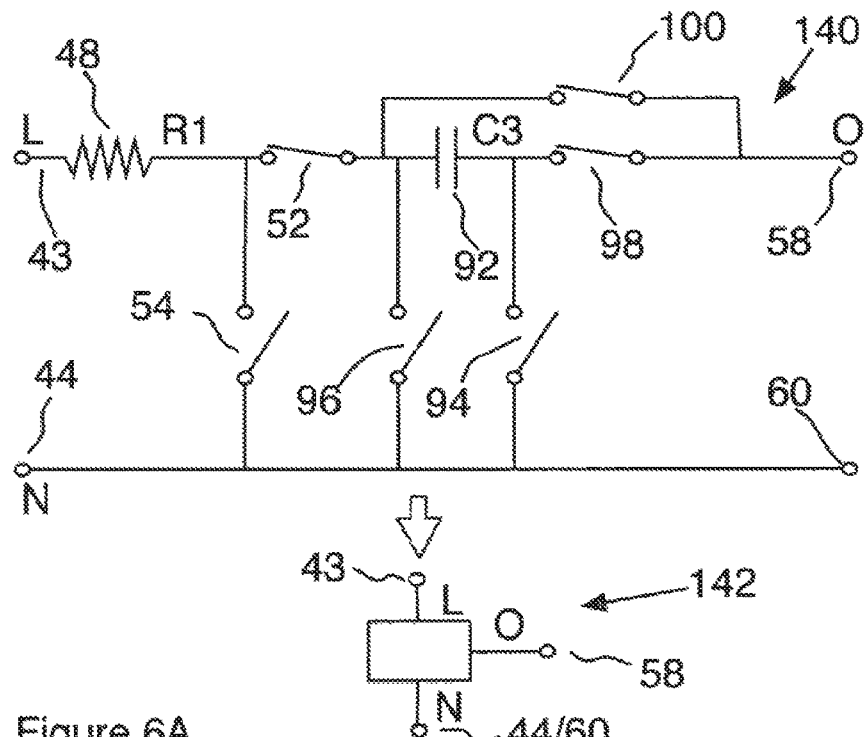
FIG. 6A is a circuit diagram of a switch network comprised in embodiments of the present invention.
Figure 6B:
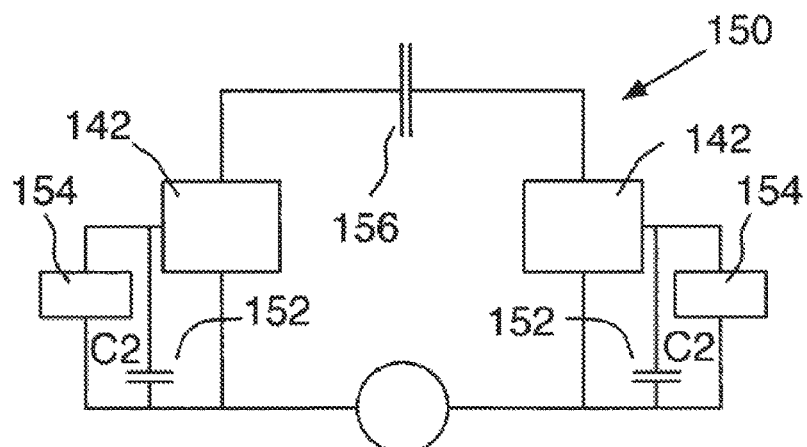
FIG. 6B is a circuit diagram of a first embodiment of a power conversion arrangement.

First to third embodiments of a power conversion arrangement will now be described with reference to FIGS. 6A to 6E. A circuit diagram of a switch network 140 comprised in the first to third embodiments of the power conversion arrangement is shown in FIG. 6A. Features of the switch network 140 of FIG. 6A in common with the second embodiment of FIG. 3 are indicated with common reference numerals and the reader's attention is directed to the description provided above with reference to FIG. 3 for a description of such common features. Features particular to the switch network 140 of FIG. 6A will now be described. As can be seen from FIG. 6A, the switch network 140 lacks the capacitor 46 and the holding capacitor 56. The live connection to the switch network 140 of FIG. 6A is therefore constituted by node 43. Furthermore the switch network 140 is equivalent to the circuit block 142 shown towards the lower part of FIG. 6A.

A first embodiment of a power conversion arrangement 150 is shown in FIG. 68. The power conversion arrangement 150 comprises two switch networks 142, with one switch network 142 being coupled at a low circuit side to the live conductor of a mains supply and the other switch network 142 being coupled at a low circuit side to the neutral conductor of a mains supply. Each of the switch networks 142 has a holding capacitor 152 connected across its output stage and a different load 154 connected to its output stage. In addition a first terminal of an X type capacitor 156 is connected to the high side of the switch network 142 that is coupled at its low circuit side to the neutral conductor of the mains supply. A second terminal of the X type capacitor 156 is connected to the high side of the switch network 142 that is coupled at its low circuit side to the live conductor of the mains supply. The X type capacitor 156 is therefore shared between the two switch networks 142. Otherwise each switch network 142 has a form and function as described above with reference to either FIG. 2 or FIG. 3.

Figure 1:
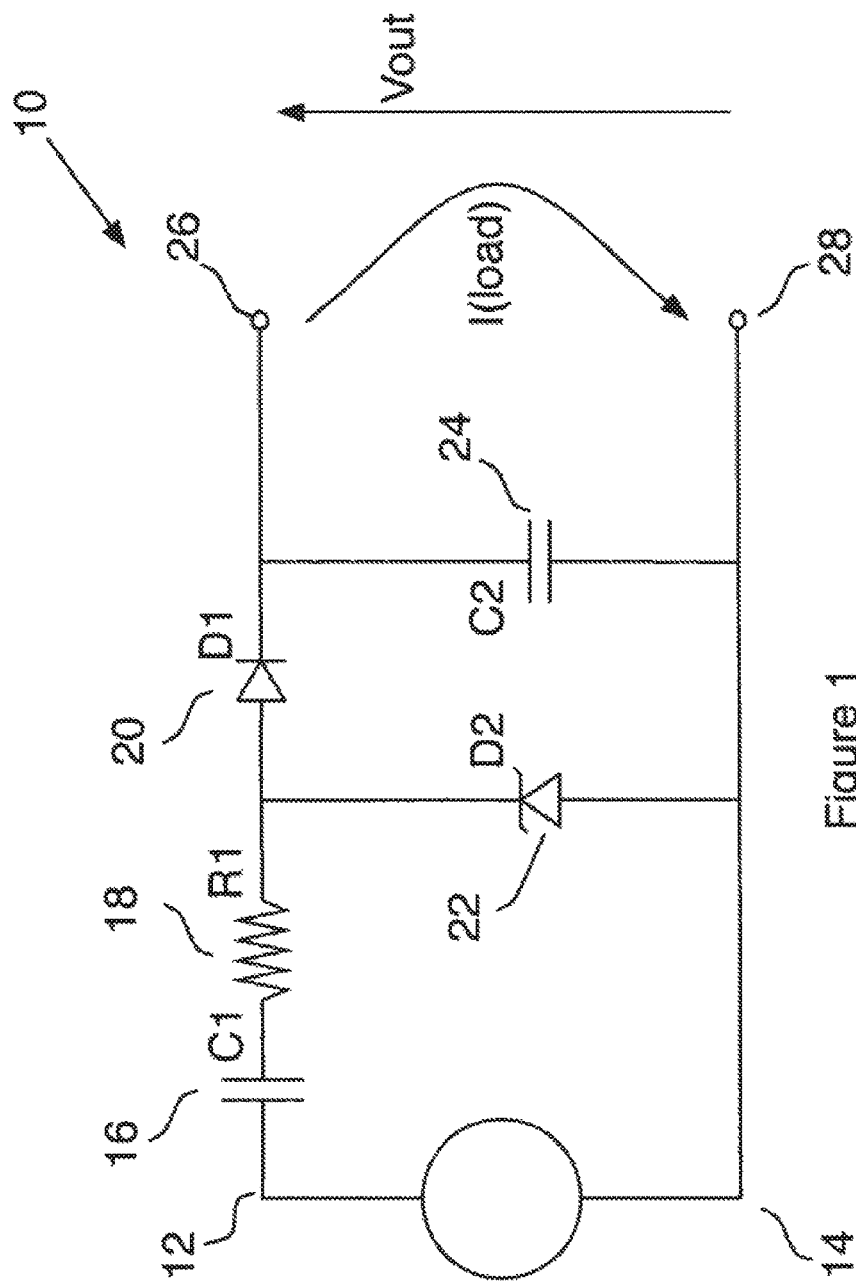
FIG. 1 is a circuit diagram of a capacitive transformerless power conversion apparatus of known form.
Figure 6C:
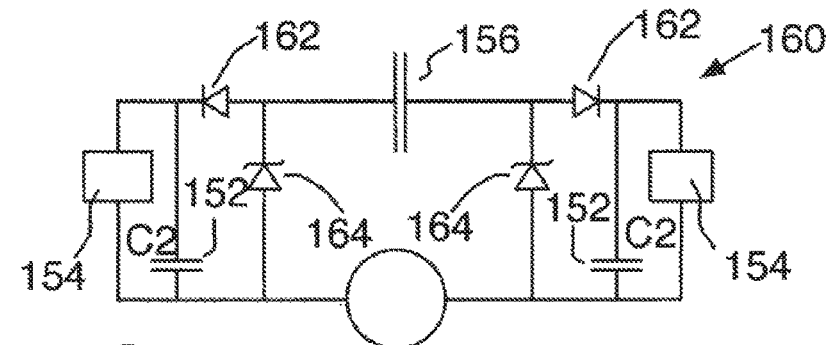
FIG. 6C is a circuit diagram of a second embodiment of a power conversion arrangement.

A circuit diagram of a second embodiment of a power conversion arrangement 160 is shown in FIG. 6C. Features of the second embodiment of power conversion arrangement 160 in common with the first embodiment of power conversion arrangement 150 are indicated with common reference numerals and the reader's attention is directed to the description provided above with reference to FIG. 68 for a description of such common features. Features particular to the second embodiment of power conversion arrangement 160 will now be described. The second embodiment comprises a diode 162 and a Zener diode 164 instead of each switch network 142 in the same configuration as shown in FIG. 1. The switches of the second embodiment are therefore operative of themselves, i.e; in dependence on the relative voltage levels of the diodes 162 and Zener diodes 164, instead of in dependence on control signals. The second embodiment of power conversion arrangement 160 therefore lacks the switch control circuits of previous embodiments. Otherwise the second embodiment of power conversion arrangement 160 operates in the same fashion as the first embodiment of power conversion arrangement 150 with the X type capacitor 156 being shared.

Figure 6D:
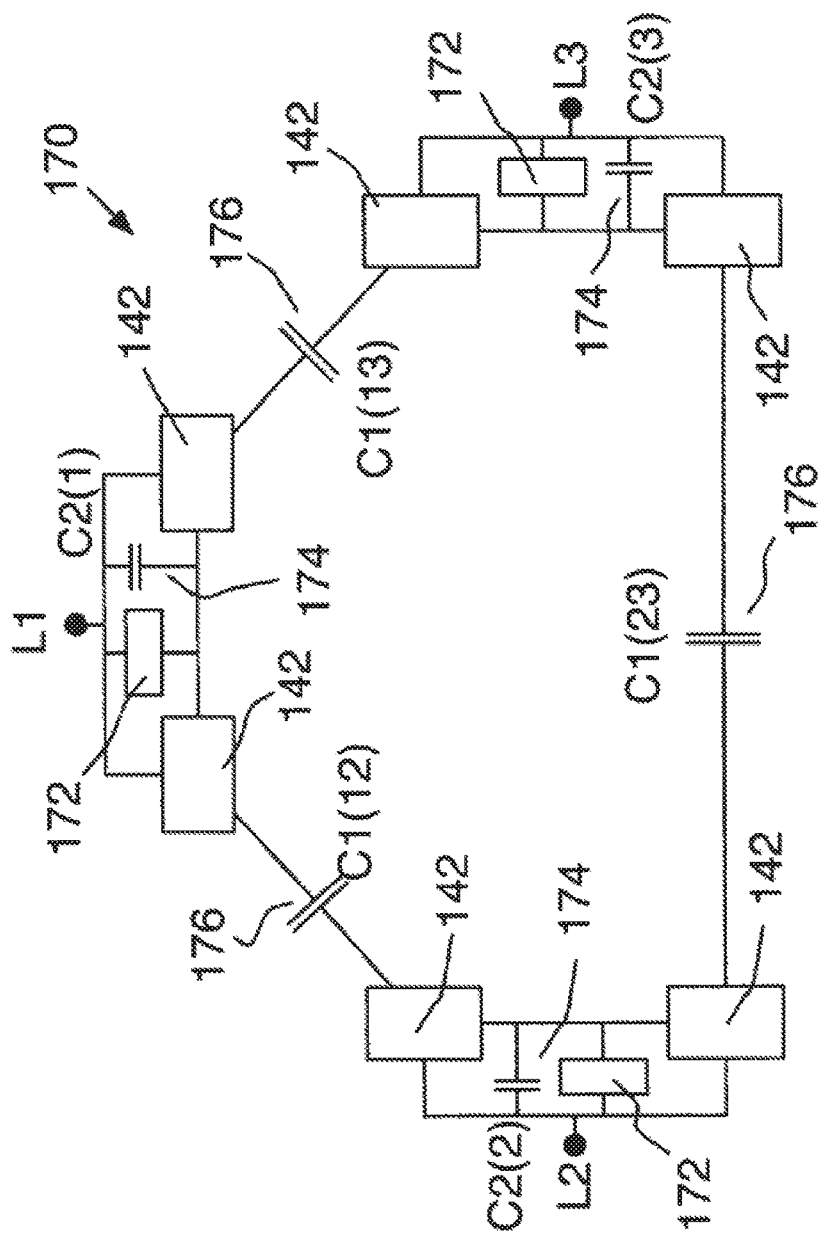
FIG. 6D is a circuit diagram of a third embodiment of a power conversion arrangement.
Figure 6E:
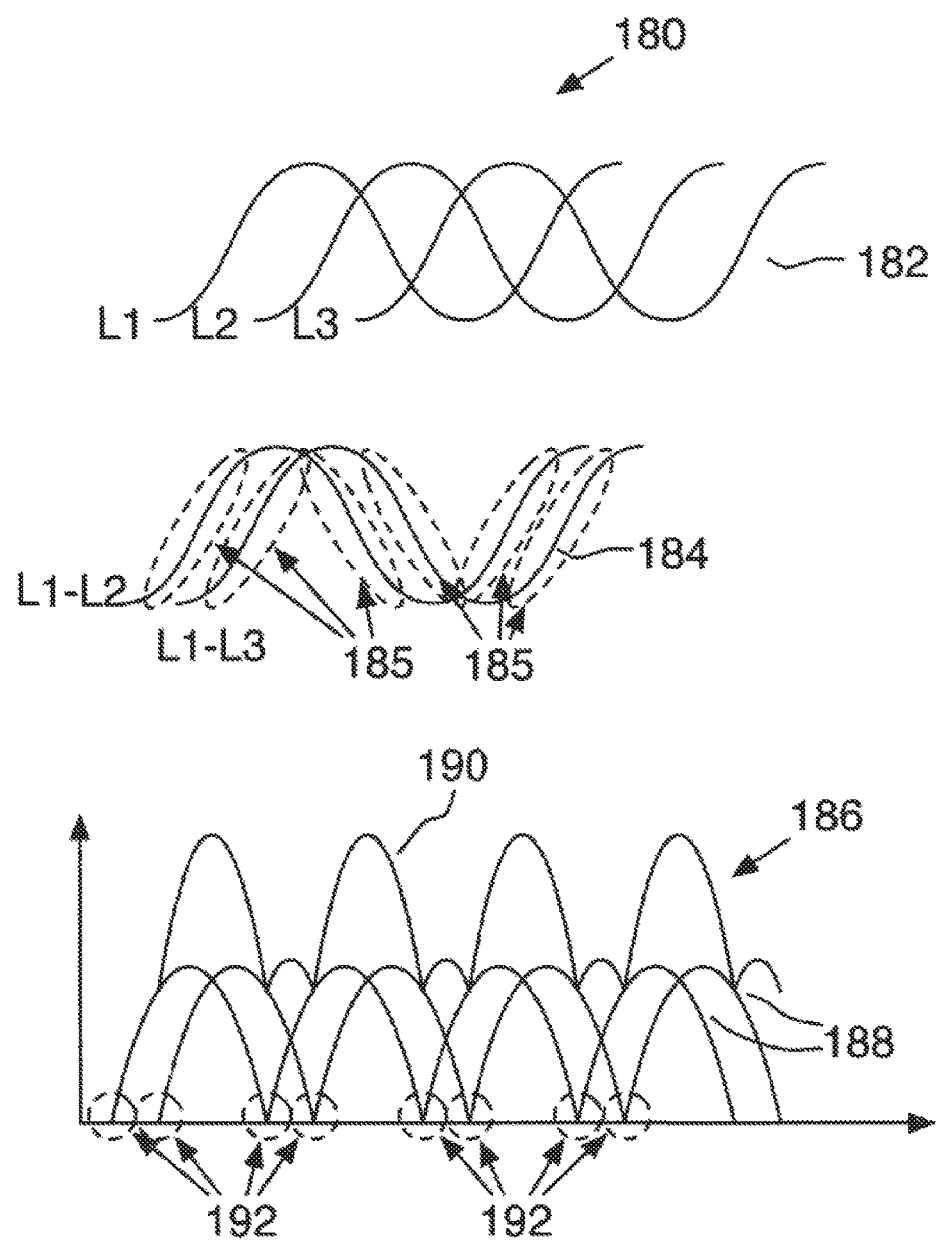
FIG. 6E shows signal waveforms in the third embodiment of FIG. 6D.

A circuit diagram of a third embodiment of a power conversion arrangement 170 is shown in FIG. 6D. The third embodiment of power conversion arrangement 170 comprises three pairs of power conversion apparatus in a delta configuration. Each pair of power conversion apparatus comprises two switch networks 142, which provide power to a different one of three loads 172, and a holding capacitor 174. Each pair of power conversion apparatus is coupled at its low input side to a different phase of a three phase mains supply. The high input side of each switch network 142 in each pair is electrically connected to a different terminal of an X type capacitor 176 and such each of three different X type capacitors 176 is shared between adjacent pairs of power conversion apparatus in the delta configuration. More specifically each pair of power conversion apparatus is electrically coupled at each of its two high input sides with its neighbouring pair of power conversion apparatus with an X type capacitor 176 being in series between each neighbouring pair of power conversion apparatus. The switch networks 142 and power conversion apparatus comprised in the third embodiment of power conversion arrangement 170 are of a form and function as described above with reference to FIG. 3. Signal waveforms 180 of the third embodiment of FIG. 6D are shown in FIG. 6E. The top plot 182 shows the voltage waveform of three phases of the mains supply. The middle plot 184 shows the delta-voltage waveforms for the pair of power conversion apparatus coupled to a first phase. As can be seen from the middle plot, there is power available during the circled parts 185 of the waveforms and therefore power available substantially all of the time on account of the phase relationship of the three phase supply. The bottom plot 186 shows the available power on they axis against time on the x axis with two of three single phase waveforms 188 represented and the combination of the two single phase waveforms 190 also represented. As can be appreciated from the bottom plot 186, there are substantially no dead periods 192 and the peak power of the combination of the three single phase waveforms 190 is substantially higher compared with the single phase waveforms 188.

In an un-illustrated embodiment the power conversion arrangement has a star configuration having first to third power conversion apparatus. Each of the first to third power conversion apparatus is coupled to a respective high voltage capacitor with each of the three high voltage capacitors being coupled to a different live phase. The three power conversion apparatus are coupled to the neutral phase. In a form of the present embodiment, the star configuration further comprises three further power conversion apparatus and is configured such that each phase leg of the power conversion arrangement comprises a pair of power conversion apparatus in a back to back configuration with the high voltage capacitor therebetween. This back to back configuration of power conversion apparatus and high voltage capacitor is as is shown in each of the three legs of the delta configuration of FIG. 6D. According to another embodiment the present star configuration and the above described delta configuration are combined in the same apparatus. The combining of the star and delta configurations in the same apparatus will be within the ordinary design skills of the person skilled in the art. In another un-illustrated embodiment the power conversion arrangement comprises two live phases and neutral in a split phase configuration with each of the two live phase legs of the power conversion arrangement comprising a pair of power conversion apparatus in a back to back configuration with a high voltage capacitor. The split phase configuration further comprises a first power conversion apparatus coupled to a first one of the two live phases and a further high voltage capacitor and a second power conversion apparatus coupled to a second one of the two live phases and the same further high voltage capacitor.

In a further un-illustrated embodiment the power conversion arrangement comprises first and second power conversion apparatus which are coupled to the same phase, such as the same live phase. The first and second power conversion apparatus share the same high voltage capacitor. A rectifier, such as a diode, is disposed between each of the first and second power conversion apparatus and the high voltage capacitor such that the two rectifiers are of opposite polarity. In use, the first power conversion apparatus is configured to transfer power to its load in a positive going part only of the high voltage AC signal and the second power conversion apparatus is configured to transfer power to its load in a negative going part only of the high voltage AC signal.

A portion of a power converter can be configured for electric field energy harvesting or energy scavenging using a capacitive coupling. In an example, one or more of the power converter examples discussed herein can include or use a capacitor, such as the capacitor 46. The capacitor 46 can be configured to harvest or convert energy from a source, such as from the live connection 42, for storage or use in powering another device.

Figure 7:
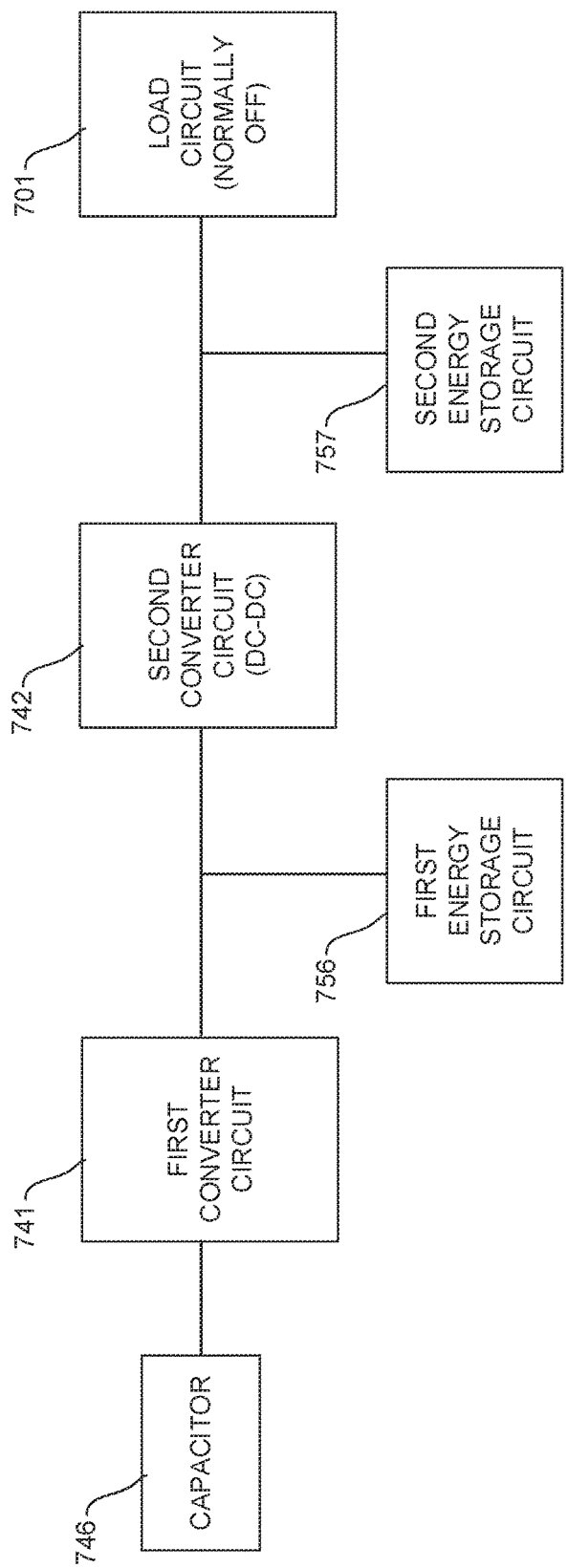
FIG. 7 illustrates generally an example of a power converter system that can include or use a capacitor.

FIG. 7 illustrates generally an example of a power converter system that can include or use a capacitor 746. The capacitor 746 can have various forms but is generally configured to harvest energy from an electric field, such as from a power transmission line. In an example, the capacitor 746 is substituted for, or used together with, the high voltage capacitor 46 (C1) described in the examples of FIGS. 2, 3, and 5, among others.

In an example, the capacitor 746 is configured to harvest energy from a transmission line and provide a first power signal to a first converter circuit 741. The first converter circuit 741 can include various components from the converter circuits described herein in the examples of FIGS. 2, 3, and 5. For example, with reference to the example of FIG. 2, the first converter circuit 741 can include one or more of the resistor 48 and the first and second switches 52 and 54. In an example, the first converter circuit 741 further includes the switch control circuit 62. In some examples, a resistor is not used between the capacitor 746 and the first and second switches 52 and 54.

Following the first converter circuit 741, the example of FIG. 7 includes a first energy storage circuit 756. The first energy storage circuit 756 is configured to store a portion of the energy harvested using the capacitor 746. In an example, the first energy storage circuit 756 corresponds to or includes the holding capacitor 56 from the examples of FIG. 2, 3, or 5.

In the example of FIG. 7, an output of the first converter circuit 741 and/or the first energy storage circuit 756 can be coupled to a second converter circuit 742. The second converter circuit 742 can be a DC-DC converter circuit, such as configured to increase or decrease a magnitude of a received voltage signal. The second converter circuit 742 can include a buck converter to decrease a magnitude of a voltage signal received from the first converter circuit 741, or a boost converter to increase a magnitude of the voltage signal received from the first converter circuit 741, among other types of converters. In an example, the second converter circuit 742 is configured to down-convert a received signal to about 5 to 20 volts.

A second energy storage circuit 757 can be coupled to an output of the second converter circuit 742, such as to store a voltage signal at a higher or lower signal level than is stored by the first energy storage circuit 756. Outputs from one or both of the second converter circuit 742 and the second energy storage circuit 757 can be coupled to a first load circuit 701. In an example, the first load circuit 701 comprises a sensor or other device or module that can be used or power cycled at various times. For example, the first load circuit 701 can include an environmental sensor, such as powered using the converted energy harvested using the capacitor 746, and the environmental sensor can be configured to periodically monitor or sample one or more environmental conditions such as temperature or humidity. Other types of sensors or devices can similarly be used.

In an example, an electric field energy harvesting circuit or system includes or uses a pair of conductors that are spaced apart by a dielectric or insulator member. In an example, In the example of FIG. 8, a first conductor, such as a first transmission line 810, can be a portion of a power transmission line, such as for a mains or other AC signal. A second conductor 801 can be provided around the first transmission line 810 and spaced apart from the first transmission line 810 using a first dielectric 802. Used together, the first transmission line 810 and second conductor 801 comprise portions of a capacitor, such as the capacitor 746 from the example of FIG. 7. In other words, the energy harvesting example can include a conductive sheath or cylinder that can be used as part of a capacitor to extract energy from an electric field, such as an electric field about a transmission line that carries an electrical signal. In an example, the conductive cylinder can be formed from multiple conductive components or pieces that are electrically connected around an existing transmission line. For example, the conductive sheath can be comprised of conductive tape, foil, or other material that can placed about a transmission line without disconnecting the transmission line and threading it through a unitary cylinder. Thus the present energy harvesting system can be applied to an existing transmission line without interrupting a service provided by such line.

Figure 8:
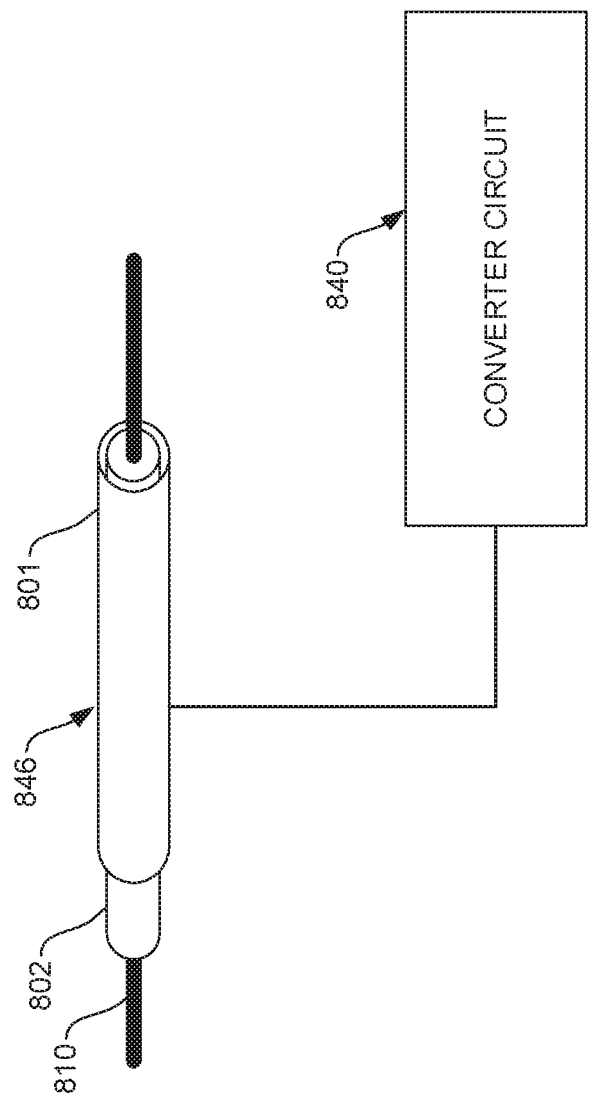
FIG. 8 illustrates generally an example that includes a harvesting capacitor coupled to a power converter system.

FIG. 8 illustrates generally an example that includes a harvesting capacitor 846 coupled to a power converter system 840. The harvesting capacitor 846 includes a conductive sheath that surrounds a portion of a first transmission line 810. The first transmission line is configured to carry an AC signal, such as up to and including an AC signal having a kilovolt swing or more. The first transmission line 810 includes a single phase conductor, however, multiple phase conductors can be used. In an example, the converter circuit 840 includes the power conversion apparatus 40, and the harvesting capacitor 846 includes the high voltage capacitor C1 from the examples of FIGS. 2, 3, and 5, among others.

The example of FIG. 8 can similarly be applied across multiple different phases in a multiple-phase power distribution system. For instance, respective different harvesting capacitors (e.g., cylindrical sheath capacitors or other style capacitors) can be provided around different transmission lines carrying different phase signals. In an example, a common harvesting capacitor (e.g., a cylindrical sheath capacitor or other style capacitor) can be provided around multiple discrete transmission lines that carry different phase signals.

In an example, an energy harvesting system includes a conductive cylinder provided about, but spaced apart from, an inner conductor. Such a system can be modeled by a pair of capacitors connected in series. A first capacitor represents a capacitance between the inner conductor and the conductive cylinder, and a second capacitor represents a capacitance between the conductive cylinder and a reference (e.g., earth ground). Another device, such as an active sensor, or power storage device or battery, can be coupled as a resistive load that is coupled in parallel with the first capacitor, for example, the first load circuit 701 from the example of FIG. 7.

In an example, an energy harvesting system includes a capacitor formed by parallel pads on different layers of a circuit board. For example, a mains or other source signal can be coupled to a first pad on a first layer of the circuit board. The first pad provides a first conductor of a harvesting capacitor. A second pad on a different second layer of the circuit can provide a second conductor of the harvesting capacitor. In an example, each of the pads has a surface area of about one square centimeter separated by a layer of FR-4 epoxy. Such a configuration provides a capacitor of around 7 pF. When the example capacitor is driven by a 230V RMS signal (e.g., at 50 Hz), the capacitor yields about 400 nA and the output voltage can be converted to about 20 V. The output can provide about 8 uW of power.

Figure 9:
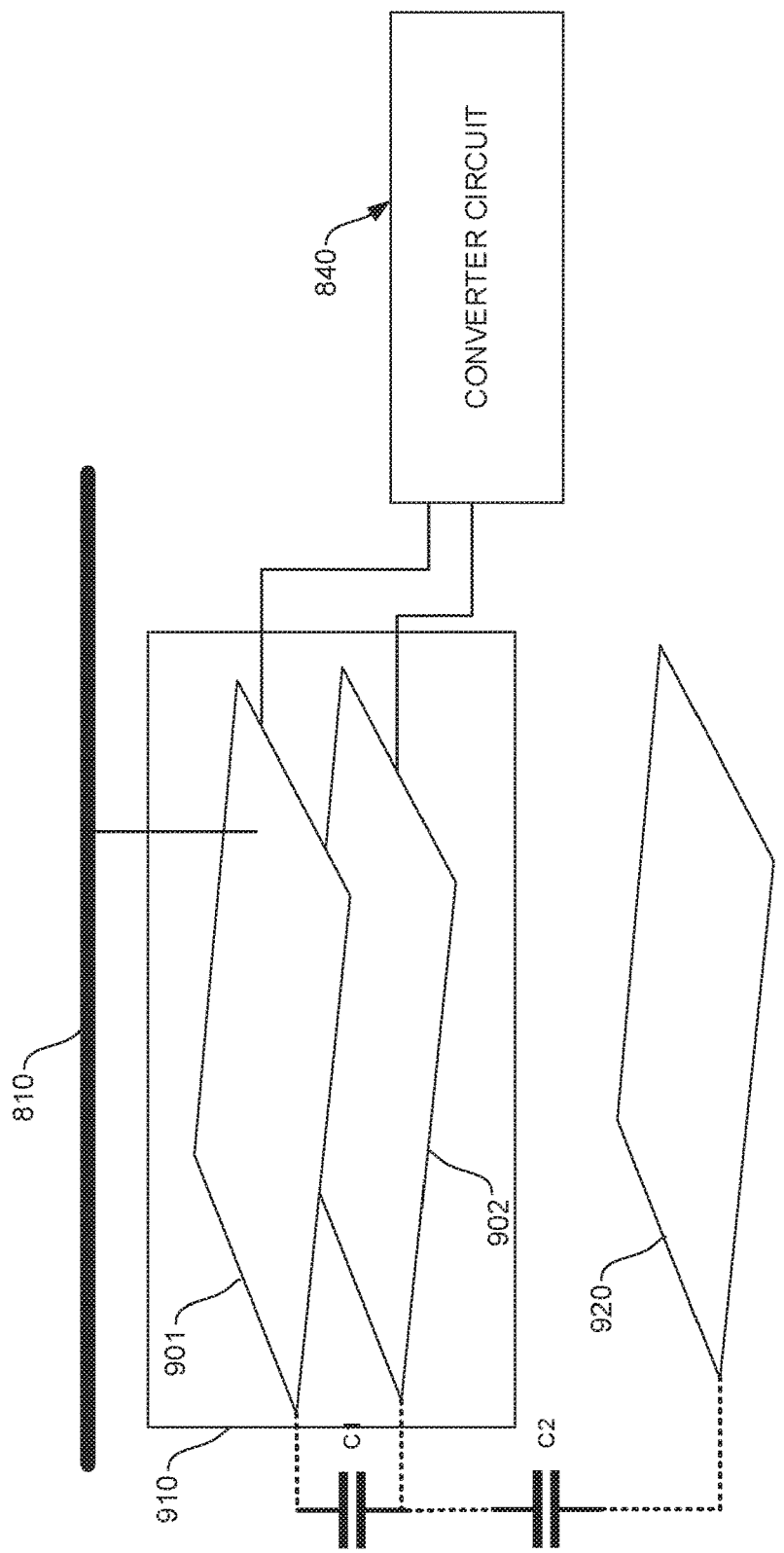
FIG. 9 illustrates generally an example that includes a PCB-based harvesting capacitor coupled to a converter circuit.

FIG. 9 illustrates generally an example that includes a PCB-based harvesting capacitor coupled to a converter circuit. In the example, a first multiple-layer PCB 910 includes a first pad 901 on a first layer and a second pad 902 on a different second layer. The layers can be spaced apart using a dielectric layer FR-4 or other insulator). In the example, the first pad 901 is coupled to the first transmission line 810, such as can include a conductor that carries one of multiple phases in a power distribution system. When the first pad 901 is energized by a signal from the first transmission line 810, a first capacitance C1 exists between the first and second pads 901 and 902. A second capacitance C2 can exist between the PCB 910 and ground 920. An electric field harvested by C1 can be provided to the convert circuit 840 as shown.

A harvested power signal from an electric field energy harvesting system can be stored or used to power a device. In an example, a harvested power signal is used to power a sensor device or a transceiver, such as for use in an Internet of Things environment. In an example, the harvested power signal is used to power one or more of an environmental sensor configured to monitor or record information about temperature or humidity; a motion sensor such as a tilt sensor, vibration sensor, accelerometer, or gyroscope configured to monitor position changes; a sleep/wake circuit that is configured to periodically trigger activity by another circuit or sensor; a timer circuit; an MD or other data communication circuit; a tracking device; a WiFi-enabled sensor; an optical sensor; a data recorder; a mechanical stress sensor; an acoustic sensor; a utility consumption sensor; or other device or processor.

VARIOUS NOTES

The above description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Geometric terms, such as "parallel", "perpendicular", "round", or "square", are not intended to require absolute mathematical precision, unless the context indicates otherwise. Instead, such geometric terms allow for variations due to manufacturing or equivalent functions. For example, if an element is described as "round" or "generally round," a component that is not precisely circular (e.g., one that is slightly oblong or is a many-sided polygon) still encompassed by this description.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A power conversion system configured to receive a high voltage alternating current (AC) signal at an input stage of the system and to provide, based on the high voltage AC signal, a low voltage direct current (DC) signal from an output stage of the system, the power conversion system comprising:
   a first capacitor comprising first and second conductors, wherein the first conductor comprises a portion of a main path for the high voltage AC signal;
   a first path configured to carry current from the first capacitor in at least one of a positive going part and a negative going part of the high voltage AC signal;
   a second path configured to selectively shunt current from the first capacitor in the positive going part and the negative going part of the high voltage AC signal;
   first and second switches configured to control current flow to the first and second paths, respectively; and
   a switch control circuit configured to control the first and second switches based on a phase of the high voltage AC signal;
   wherein the output stage receives current flowing in the first path.

2. The power conversion system of claim 1, wherein the switch control circuit is configured to control the first switch to enable current flow to the first path during multiple different portions of the same positive going part or negative going part of the high voltage AC signal.

3. The power conversion system of claim 1, further comprising a dielectric material provided about the first conductor, and wherein the second conductor of the first capacitor comprises a conductive member that surrounds a portion of the dielectric material and the first conductor along a first length of the first conductor.

4. The power conversion system of claim 3, wherein the first conductor comprises a transmission line for a power mains signal.

5. The power conversion system of claim 1, wherein the first and second conductors of the first capacitor include respective pads on parallel layers of a circuit board.

6. The power conversion system of claim 1, wherein the switch control circuit is configured to control at least one of the first and second switches based on a value of the low voltage DC signal from the output stage.

7. The power conversion system of claim 1, wherein the first and second switches are operative substantially out of phase with each other.

8. The power conversion system of claim 1, wherein at least one of the first and second switches is switched at a frequency greater than a frequency of the high voltage AC signal.

9. The power conversion system of claim 1, wherein the power conversion system comprises an intermediate energy storing component and third, fourth and fifth switches which are each operable in dependence on the low voltage direct current signal, and wherein the intermediate energy storing component comprises one of an intermediate capacitor and an intermediate inductor, the intermediate energy storing component being disposed in series between the first capacitor and the output stage.

10. The power conversion system of claim 1, wherein the first path is in series with the output stage and the second path is in parallel with the output stage.

11. The power conversion system of claim 1, wherein each of the first and second paths is configured to carry current in less than all of the positive going part or the negative going part within a cycle of the high voltage AC signal.

12. The power conversion system of claim 1, further comprising a DC-DC converter circuit configured to receive a first output signal having a first voltage magnitude from the output stage and provide a second output signal having a lesser second voltage magnitude.

13. A method for providing a low voltage direct current (DC) signal from an output stage of a power conversion system based on a received high voltage alternating current (AC) signal at an input stage of the system, the system including a main path with a capacitor in series with the input, the method comprising:
   in a first path, carrying current from the main path in at least one of a positive going part and a negative going part of the high voltage AC signal;
   in a second path, shunting current from the main path in a positive going part and a negative going part of the high voltage AC signal;
   using a switch control circuit, generating respective control signals for first and second switches based on a phase of the high voltage AC signal;
   controlling the first and second switches using the respective control signals, wherein the first and second switches are respectively disposed in the first and second paths to modulate current flowing from the main path to the first and second paths; and
   receiving, at the output stage, an output signal from the first path.

14. The method of claim 13, wherein the generating the respective control signals includes using information about the low voltage DC signal.

15. The method of claim 13, further comprising receiving a current in the main path from an AC mains signal using the capacitor that is in series with the input, the capacitor including a conductor provided around a portion of a transmission line carrying the AC mains signal and configured to harvest energy from an electric field produced by the AC mains signal.

16. The method of claim 13, wherein the controlling the first and second switches includes operating the switches substantially out of phase with each other and switching at least one of the first and second switches at a frequency that is greater than a frequency of the high voltage AC signal.

17. The method of claim 13, further comprising receiving the output signal and down-converting an amplitude of the output signal using a DC-DC converter circuit.

18. An energy harvesting and power conversion system configured to receive a high voltage alternating current (AC) signal at an input stage of the system and to provide, based on the high voltage AC signal, a low voltage direct current (DC) signal from an output stage of the system, the power conversion system comprising:
   an electric field energy harvesting circuit comprising a portion of a main path for the high voltage AC signal;
   a first path configured to can current from the harvesting circuit in at least one of a positive going part and a negative going part of the high voltage AC signal;
   a second path configured to carry current from the harvesting circuit in the positive going part and negative going part of the high voltage AC signal;
   first and second switches configured to control current flow to the first and second paths, respectively; and
   a switch control circuit configured to control the first and second switches based on a phase of the high voltage AC signal;
   wherein the output stage receives current flowing in the first path.

19. The power conversion system of claim 18, wherein the switch control circuit is configured to control the first switch to enable current flow to the first path during multiple different portions of the same positive going part or negative going part of the high voltage AC signal.

20. The power conversion system of claim 18, wherein the control circuit is configured to switch at least one of the first and second switches at a frequency greater than a frequency of the high voltage AC signal.

21. The energy harvesting and power conversion system of claim 18, wherein the electric field energy harvesting circuit comprises a first capacitor with first and second conductors, wherein the first conductor comprises the portion of the main path for the high voltage AC signal.

22. The energy harvesting and power conversion system of claim 21, wherein the second conductor of the first capacitor comprises a cylindrical conductor that is spaced apart from and provided coaxially with the first conductor of the first capacitor.

23. The energy harvesting and power conversion system of claim 21, wherein the first and second conductors of the first capacitor comprise pads of a circuit board provided on respective parallel and spaced apart layers of the circuit board.

24. The power conversion system of claim 18, wherein the switch control circuit is configured to control at least one of the first and second switches based on the low voltage DC signal from the output stage.

* * * * *

UNITED STATES PATENT AND TRADEMARK OFFICE
CERTIFICATE OF CORRECTION

PATENT NO. : 10,381,948 B2
APPLICATION NO. : 15/923381
DATED : August 13, 2019
INVENTOR(S) : Hurwitz et al.

Page 1 of 1

It is certified that error appears in the above-identified patent and that said Letters Patent is hereby corrected as shown below:

On the Title Page

In item (30), in "Foreign Application Priority Data", in Column 1, Line 1, delete "1315061.0" and insert --13150610.0-- therefor In the Claims In Column 30, Line 15, in Claim 18, delete "can" and insert --carry-- therefor Signed and Sealed this
Third Day of November, 2020

Andrei Iancu
*Director of the United States Patent and Trademark Office*